(12) United States Patent
Kitahara

(10) Patent No.: US 11,365,996 B2
(45) Date of Patent: Jun. 21, 2022

(54) MEASUREMENT CONTROL DEVICE AND FLOW MEASUREMENT DEVICE

(71) Applicant: DENSO CORPORATION, Kariya (JP)

(72) Inventor: Noboru Kitahara, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/075,909

(22) Filed: Oct. 21, 2020

(65) Prior Publication Data

US 2021/0033441 A1 Feb. 4, 2021

Related U.S. Application Data

(63) Continuation of application No. PCT/JP2019/016085, filed on Apr. 15, 2019.

(30) Foreign Application Priority Data

Apr. 27, 2018 (JP) .............................. JP2018-086350

(51) Int. Cl.
*G01F 1/696* (2006.01)
*G01F 1/72* (2006.01)

(52) U.S. Cl.
CPC .............. *G01F 1/6965* (2013.01); *G01F 1/72* (2013.01)

(58) Field of Classification Search
CPC ........ G01F 1/6965; G01F 1/72; G01F 15/046; G01F 1/6842
See application file for complete search history.

(56) References Cited

U.S. PATENT DOCUMENTS

| 6,556,929 | B1 | 4/2003 | Kleinhans et al. |
| 6,672,146 | B1 * | 1/2004 | Kobayashi ............ F02D 41/187 |
| | | | 73/114.34 |
| 10,190,899 | B2 * | 1/2019 | Doi ........................... G01F 1/68 |
| 10,422,676 | B2 * | 9/2019 | Sudou .................... G01F 1/6845 |
| 10,975,793 | B2 * | 4/2021 | Ito ............................ G01F 1/696 |
| 2016/0209255 | A1 | 7/2016 | Doi et al. |
| 2016/0312753 | A1 | 10/2016 | Sudou et al. |

FOREIGN PATENT DOCUMENTS

| JP | 2011-112569 | 6/2011 |
| JP | 2014-020212 | 2/2014 |
| JP | 2015-021464 | 2/2015 |
| WO | 2018/190058 | 10/2018 |

* cited by examiner

*Primary Examiner* — Freddie Kirkland, III
(74) *Attorney, Agent, or Firm* — Nixon & Vanderhye P.C.

(57) ABSTRACT

In a measurement control device that measures an airflow, an amplitude calculator calculates, by use of an output value of a sensor, a pulsation amplitude that is a difference between a pulsation maximum and an average airflow or a difference between the pulsation maximum and a pulsation minimum. The pulsation maximum is a maximum value of pulsation generated in the airflow, the average airflow is an average value of the pulsation, and the pulsation minimum is a minimum value of the pulsation. A correction parameter acquirer acquires a correction parameter corresponding to the calculated pulsation amplitude by use of a correction characteristic. An airflow corrector corrects the airflow by use of the acquired correction parameter.

13 Claims, 27 Drawing Sheets

FIG. 2
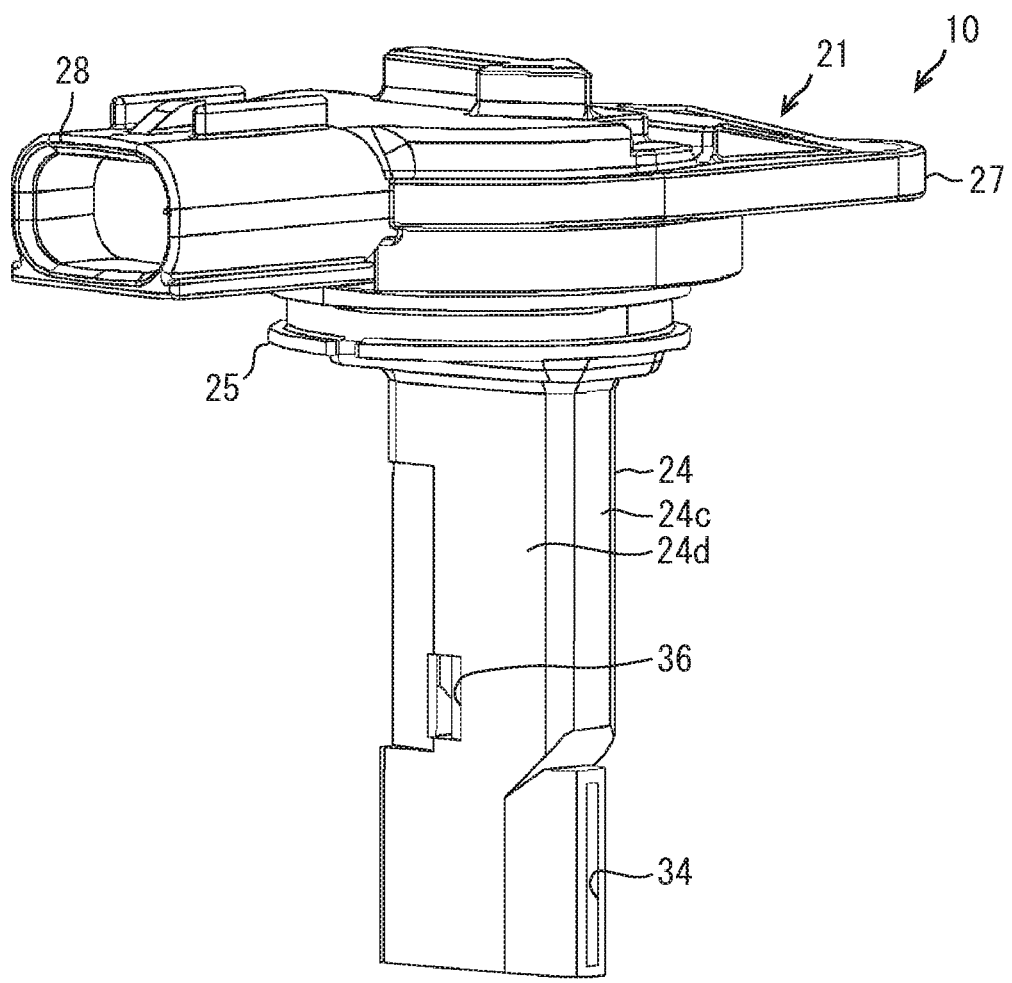
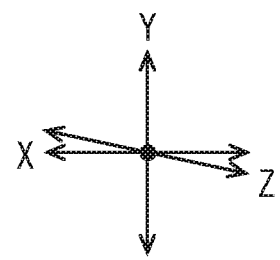

|  | FREQUENCY F1 [Hz] | ~ | FREQUENCY Fn [Hz] |
|---|---|---|---|
| AVERAGE AIRFLOW G1 [g/s] | SLOPE A11 INTERCEPT B11 | ... | SLOPE An1 INTERCEPT Bn1 |
| ~ | ... | ... | ... |
| AVERAGE AIRFLOW Gn [g/s] | SLOPE A1n INTERCEPT B1n | ... | SLOPE Ann INTERCEPT Bnn |

FIG. 17

| | PULSATION FREQUENCY F1 [Hz] | ~ | PULSATION FREQUENCY Fn [Hz] |
|---|---|---|---|
| AVERAGE AIRFLOW G1 [g/s] | SLOPE A11<br>INTERCEPT B11<br><br>Err[%] ↑<br><br>Err11<br>ErrK1 ←------<br>      APPROXIMATE VALUE<br>      PULSATION CHARACTERISTIC M11<br>   PaK1  Pa11 PaA     Pa | ... | SLOPE An1<br>INTERCEPT Bn1<br>UPPER LIMIT Pan1<br>UPPER LIMIT Errn1 |
| AVERAGE AIRFLOW G2 [g/s] | SLOPE A12<br>INTERCEPT B12<br><br>Err[%] ↑<br>Err12<br>ErrK2 ←------<br>  APPROXIMATE VALUE<br>  PULSATION CHARACTERISTIC M12<br>     PaA  PaK2 Pa12  Pa | ... | SLOPE An2<br>INTERCEPT Bn2<br>UPPER LIMIT Pan2<br>UPPER LIMIT Errn2 |
| ~ | ... | ... | ... |
| AVERAGE AIRFLOW Gn [g/s] | SLOPE A1n<br>INTERCEPT B1n<br>UPPER LIMIT Pa1n<br>UPPER LIMIT Err1n | ... | SLOPE Ann<br>INTERCEPT Bnn<br>UPPER LIMIT Pann<br>UPPER LIMIT Errnn |

FIG. 24

DUCT DIAMETER H1

|  | PULSATION FREQUENCY F1 [Hz] | ~ | PULSATION FREQUENCY Fn [Hz] |
|---|---|---|---|
| AVERAGE AIRFLOW Gave1 [g/s] | SLOPE C111 INTERCEPT B111 | ... | SLOPE C1n1 INTERCEPT B1n1 |
| ~ | ... | ... | ... |
| AVERAGE AIRFLOW Gaven [g/s] | SLOPE C11n INTERCEPT B11n | ... | SLOPE C1nn INTERCEPT B1nn |

DUCT DIAMETER H2

|  | PULSATION FREQUENCY F1 [Hz] | ~ | PULSATION FREQUENCY Fn [Hz] |
|---|---|---|---|
| AVERAGE AIRFLOW Gave1 [g/s] | SLOPE C211 INTERCEPT B211 | ... | SLOPE C2n1 INTERCEPT B2n1 |
| ~ | ... | ... | ... |
| AVERAGE AIRFLOW Gaven [g/s] | SLOPE C21n INTERCEPT B21n | ... | SLOPE C2nn INTERCEPT B2nn |

⋮

DUCT DIAMETER Hn

|  | PULSATION FREQUENCY F1 [Hz] | ~ | PULSATION FREQUENCY Fn [Hz] |
|---|---|---|---|
| AVERAGE AIRFLOW Gave1 [g/s] | SLOPE Cn11 INTERCEPT Bn11 | ... | SLOPE Cnn1 INTERCEPT Bnn1 |
| ~ | ... | ... | ... |
| AVERAGE AIRFLOW Gaven [g/s] | SLOPE Cn1n INTERCEPT Bn1n | ... | SLOPE Cnnn INTERCEPT Bnnn |

MEASUREMENT CONTROL DEVICE AND FLOW MEASUREMENT DEVICE

CROSS REFERENCE TO RELATED APPLICATIONS

The present application is a continuation application of International Patent Application No. PCT/JP2019/016085 filed on Apr. 15, 2019, which designated the U.S. and claims the benefit of priority from Japanese Patent Application No. 2018-086350 filed on Apr. 27, 2018. The entire disclosures of all of the above applications are incorporated herein by reference.

TECHNICAL FIELD

The present disclosure relates to a measurement control device and a flow measurement device.

BACKGROUND

A measurement control device calculates an airflow based on an output from an airflow sensor. In this calculation, the control device calculates a pulsation error caused by pulsation of the airflow, and corrects the airflow so that the pulsation error becomes small.

According to at least one embodiment of the present disclosure, a measurement control device measures an airflow based on an output value of a sensing portion which detects the airflow. The measurement control device includes an amplitude calculator that calculates a pulsation amplitude by use of the output value. The pulsation amplitude is a difference between a pulsation maximum and an average airflow or a difference between the pulsation maximum and a pulsation minimum. The pulsation maximum is a maximum value of pulsation generated in the airflow, the average airflow is an average value of the pulsation, and the pulsation minimum is a minimum value of the pulsation. The measurement control device includes a correction parameter acquirer that acquires a correction parameter corresponding to the pulsation amplitude calculated by the amplitude calculator by use of a correction characteristic for performing correction of the airflow. The measurement control device includes an airflow corrector that corrects the airflow by use of the correction parameter acquired by the correction parameter acquirer.

BRIEF DESCRIPTION OF DRAWINGS

The details of one or more embodiments are set forth in the accompanying drawings and the description below. Other features and advantages will be apparent from the description and drawings, and from the claims.

FIG. 2 is a perspective view of the airflow meter as viewed from a downstream outer surface side.

FIG. 17 is a diagram showing upper limit values of the pulsation amplitude and the pulsation error in the reference map.

FIG. 24 is a diagram showing a three-dimensional map.

DETAILED DESCRIPTION

Figure 1:
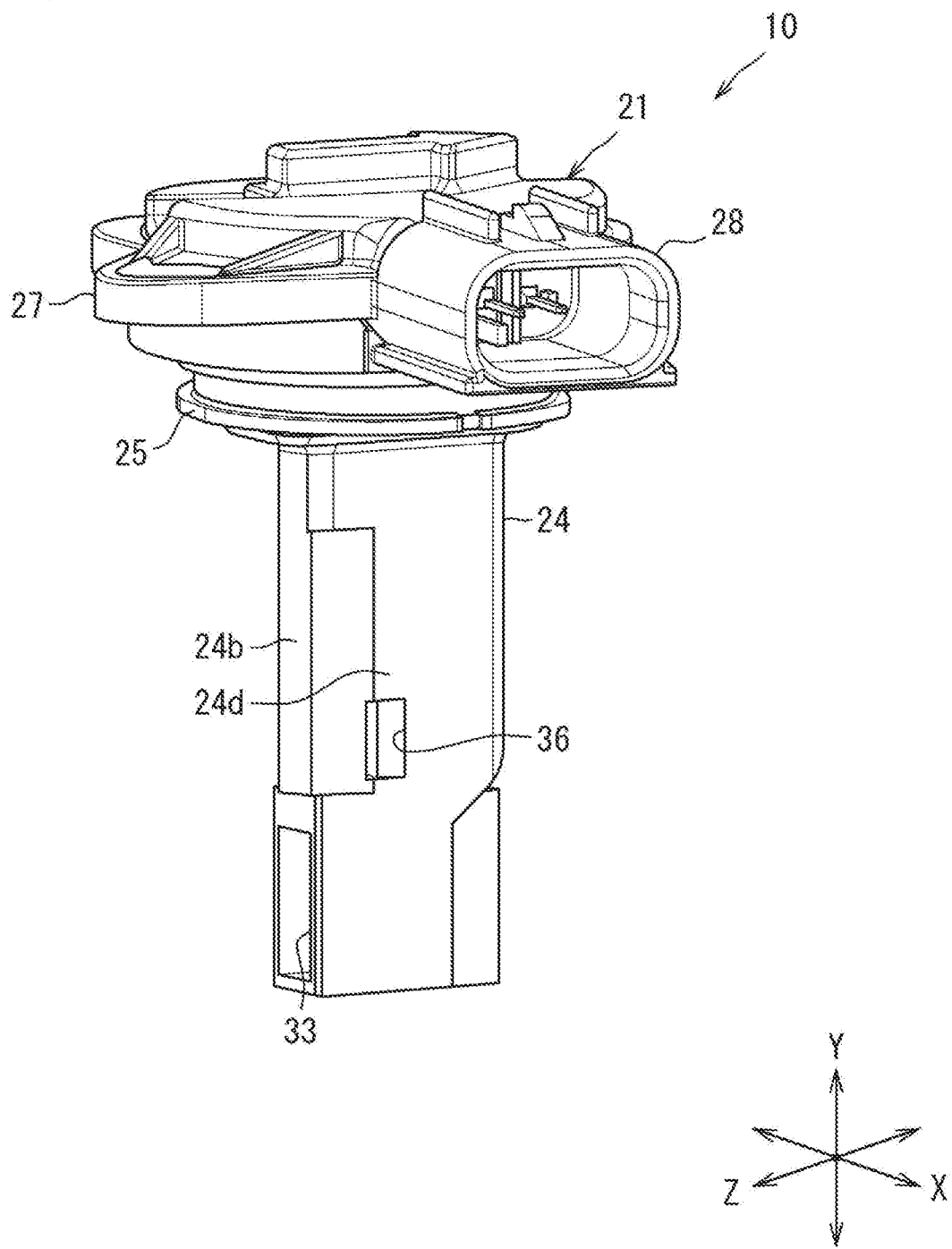
FIG. 1 is a perspective view of an airflow meter as viewed from an upstream outer surface side according to a first embodiment.

A comparative example will be described below. A measurement control device of the comparative example calculates an airflow based on an output value of an airflow sensor. The control device calculates a pulsation error, which is an error caused by pulsation of the airflow, by use of the output value of the airflow sensor, and corrects the airflow so that the pulsation error becomes small. The control device calculates a pulsation amplitude which is a difference between a pulsation maximum and a pulsation minimum, and calculates a pulsation amplitude ratio by dividing the pulsation amplitude by an average airflow which is an average value of the pulsation. Then, the control device calculates the pulsation error according to the pulsation amplitude ratio by use of a pulsation error characteristic indicating a relationship between the pulsation amplitude ratio and the pulsation error.

When the control device calculates an airflow based on an output value of a sensor provided in a bypass flow channel and measures an airflow of a backward flow that has flowed into a bypass outlet of the bypass flow channel, the pulsation minimum is considered to be a negative value. However, when the backward flow hardly flows into the bypass outlet due to a turbulence of an airflow around the bypass outlet or the like, the output value of the sensor hardly becomes a negative value even though the backward flow of the air occurs outside the bypass flow channel. In that case, the pulsation minimum of the output value becomes larger than a true minimum, and accordingly, the pulsation amplitude of the output value becomes smaller than the true pulsation amplitude, and further, the average airflow of the output value becomes larger than the true average airflow.

As described above, when the output value becomes smaller than the true value with respect to the pulsation amplitude and the output value becomes larger than the true value with respect to the average airflow due to occurrence of the backward flow of the air outside, the pulsation amplitude ratio of the output value calculated by dividing the pulsation amplitude by the average airflow becomes smaller than the true pulsation amplitude ratio. For that reason, the output value of the pulsation amplitude ratio corresponding to a predetermined pulsation error becomes larger than the true value. In that case, in the comparative example, the increase or decrease in the pulsation error tends to become large as compared with the increase or decrease of the pulsation amplitude ratio of the output value, and thus there is a concern that a correction accuracy of the airflow corrected by use of the pulsation error may decrease.

In contrast, the present disclosure can provide a measurement control device and a flow measurement device capable of improving an accuracy in correction of an airflow even when a backward flow of an air occurs outside.

According to a first aspect of the present disclosure, a measurement control device measures an airflow based on an output value of a sensing portion which detects the airflow. The measurement control device includes an amplitude calculator that calculates a pulsation amplitude by use of the output value. The pulsation amplitude is a difference between a pulsation maximum and an average airflow or a difference between the pulsation maximum and a pulsation minimum. The pulsation maximum is a maximum value of pulsation generated in the airflow, the average airflow is an average value of the pulsation, and the pulsation minimum is a minimum value of the pulsation. the measurement control device includes a correction parameter acquirer that acquires a correction parameter corresponding to the pulsation amplitude calculated by the amplitude calculator by use of a correction characteristic for performing correction of the airflow. The measurement control device includes an airflow corrector that corrects the airflow by use of the correction parameter acquired by the correction parameter acquirer.

According to the first aspect, the pulsation amplitude used for the calculation of the pulsation error based on the pulsation characteristic is not a value calculated using the average airflow as a denominator. Thus, even when the backward flow of the air occurs outside, the pulsation amplitude of the output value is difficult to be smaller than the true pulsation amplitude. For that reason, the error of the pulsation amplitude of the output value with respect to the true pulsation amplitude is less likely to increase. Moreover, according to this aspect, the correction parameter is acquired from the pulsation amplitude of the output value by use of the correction characteristic. Hence, the acquisition accuracy of the correction parameter can be enhanced. Therefore, even when the backward flow of air occurs outside, the accuracy in correction of the airflow can be enhanced.

A flow measurement device measures an airflow which is a flow rate of an air. The flow measurement device includes a passage flow channel that has an inflow port through which the air flows in and an outflow port through which the air flows out, a branch flow channel that is branched off from the passage flow channel and has a branch outlet through which the air that has flowed in from the passage flow channel flows out, a sensor that detects the airflow in the branch flow channel, and a measurement controller that measures the airflow by use of an output value of the sensor. The measurement controller includes an amplitude calculator that calculates a pulsation amplitude by use of the output value. The pulsation amplitude is a difference between a pulsation maximum and an average airflow or a difference between the pulsation maximum and a pulsation minimum. The pulsation maximum is a maximum value of pulsation generated in the airflow. The average airflow is an average value of the pulsation. The pulsation minimum is a minimum value of the pulsation. The measurement control device includes a correction parameter acquirer that acquires a correction parameter corresponding to the pulsation amplitude calculated by the amplitude calculator by use of a correction characteristic for performing correction of the airflow. The measurement control device includes an airflow corrector that corrects the airflow by use of the correction parameter acquired by the correction parameter acquirer.

According to the second aspect, the airflow of the air flowing through the branch flow channel is detected by the sensor. For that reason, even if the backward flow of air occurs outside the flow measurement device, when the backward flow is difficult to flow into the branch outlet, it is considered that the airflow of the backward flow is not detected by the sensor. On the other hand, the pulsation amplitude is not a numerical value obtained by dividing the pulsation amplitude by the average airflow. Therefore, similar to the first aspect, the accuracy in correction of the airflow can be increased even when the backward flow of air occurs outside.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 3:
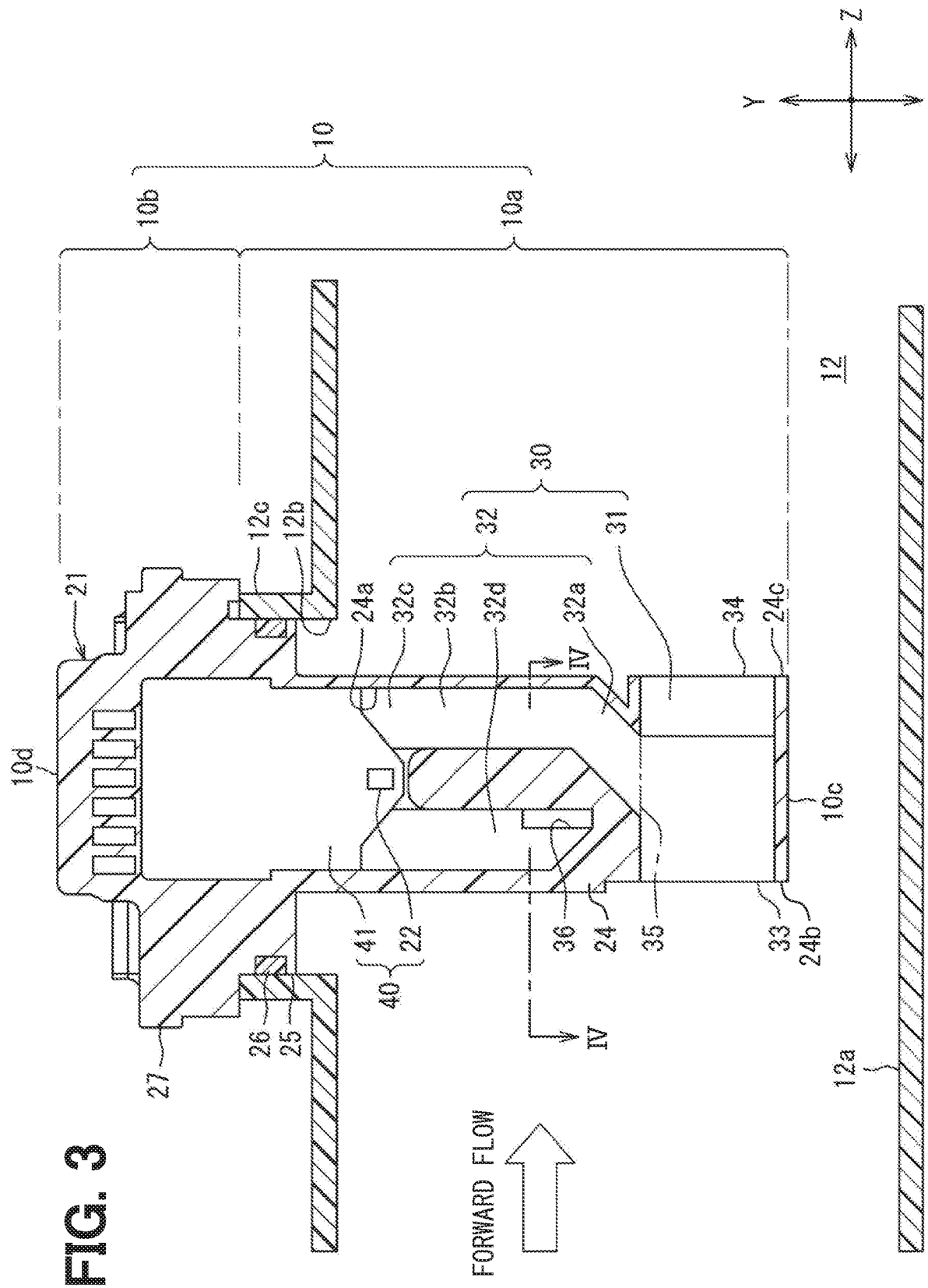
FIG. 3 is a vertical cross-sectional view of the airflow meter in a state of being attached to an intake pipe.

An airflow meter 10 shown in FIGS. 1 and 2 is included in a combustion system having an internal combustion engine such as a gasoline engine. The combustion system is mounted on a vehicle. As shown in FIG. 3, the airflow meter 10 is provided in an intake passage 12 for supplying an intake air to an internal combustion engine in a combustion system, and measures a flow rate of a gas such as intake air or a fluid such as a gas flowing through the intake passage 12, a physical quantity such as a temperature, a humidity, a pressure, and the like. In that case, the airflow meter 10 corresponds to a flow measurement device.

The airflow meter 10 is attached to an intake pipe 12a such as an intake duct that forms the intake passage 12. The intake pipe 12a is provided with an airflow insertion hole 12b as a through hole penetrating through an outer peripheral portion of the intake pipe 12a. An annular pipe flange 12c is attached to the airflow insertion hole 12b, and the pipe flange 12c is included in the intake pipe 12a. The airflow meter 10 is inserted into the pipe flange 12c and the airflow insertion hole 12b to enter the intake passage 12, and is fixed to the intake pipe 12a and the pipe flange 12c in this state.

In the present embodiment, a width direction X, a height direction Y, and a depth direction Z of the airflow meter 10 are orthogonal to each other. The airflow meter 10 extends in the height direction Y, and the intake passage 12 extends in the depth direction Z. The airflow meter 10 has an entering part 10a entering the intake passage 12 and a protruding part 10b protruding outside from the pipe flange 12c without entering the intake passage 12, and the entering part 10a and the protruding part 10b are aligned in the height direction Y. In the airflow meter 10, one of a pair of end surfaces 10c and 10d included in the entering part 10a is referred to as an airflow tip end face 10c, and the other end surface included in the protruding part 10b is referred to as an airflow base end face 10d. In that case, the airflow tip end face 10c and the airflow base end face 10d are aligned in the height direction Y. The airflow tip end face 10c and the airflow base end face 10d are orthogonal to the height direction Y. A tip end surface of the pipe flange 12c is also orthogonal to the height direction Y.

Figure 5:
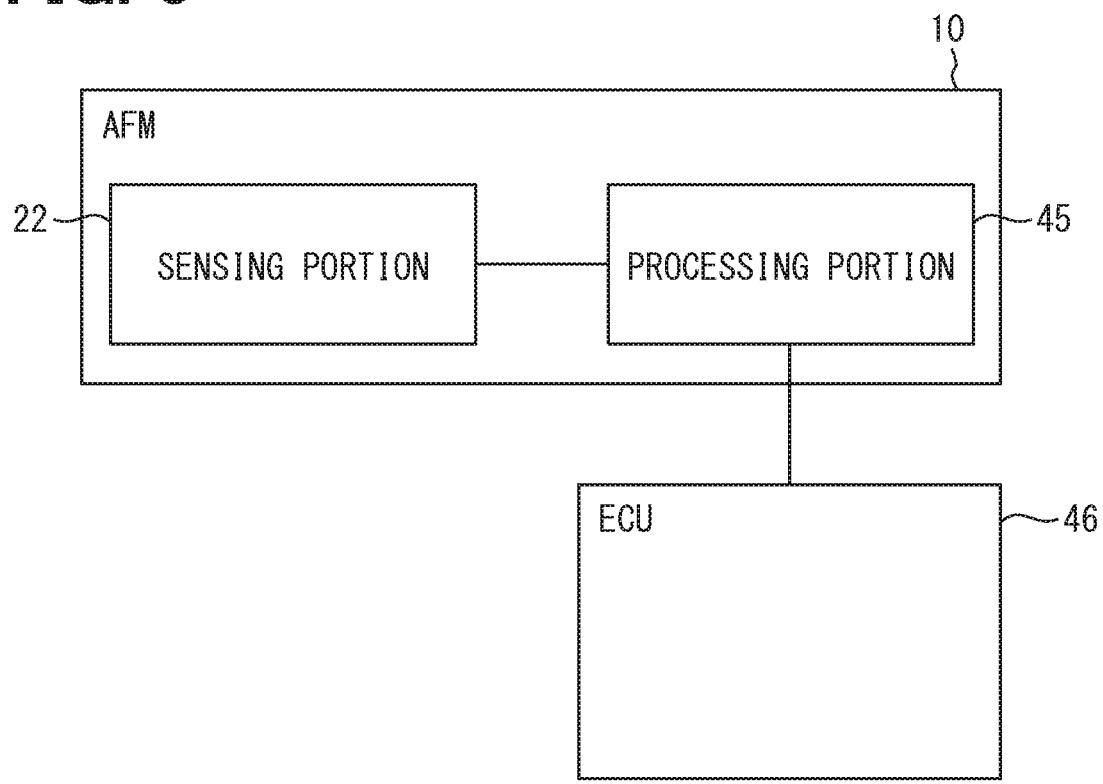
FIG. 5 is a block diagram showing a schematic configuration of the airflow meter.

As shown in FIGS. 1 and 2, the airflow meter 10 has a housing 21, a sensing portion 22 (sensor) for detecting a flow rate of an intake air (see FIGS. 3 and 5). The sensing portion 22 is provided in an internal space 24a of the housing main body 24. The housing 21 is made of, for example, a resin material or the like. In the airflow meter 10, the housing 21 is attached to the intake pipe 12a so that the sensing portion 22 is brought into contact with the intake air flowing through the intake passage 12. The housing 21 has a housing main body 24, a ring holding portion 25, a flange portion 27, and a connector portion 28, and an O-ring 26 (see FIG. 3) is attached to the ring holding portion 25.

The housing main body 24 is formed in a cylindrical shape as a whole, and in the housing 21, the ring holding portion 25, the flange portion 27, and the connector portion 28 are integrally provided in the housing main body 24. The ring holding portion 25 is included in the entering part 10a, and the flange portion 27 and the connector portion 28 are included in the protruding part 10b.

The ring holding portion 25 is provided inside the pipe flange 12c, and holds the O-ring 26 so as not to be displaced in the height direction Y. The O-ring 26 is a sealing member for sealing the intake passage 12 inside the pipe flange 12c, and is in close contact with both an outer peripheral surface of the ring holding portion 25 and an inner peripheral surface of the pipe flange 12c. A fixing hole such as a screw hole for fixing a fixing tool such as a screw for fixing the airflow meter 10 to the intake pipe 12a is provided in the flange portion 27. The connector portion 28 is a protection portion for protecting a connector terminal electrically connected to the sensing portion 22.

As shown in FIG. 3, the housing main body 24 provides a bypass flow channel 30 through which a part of the intake air flowing through the intake passage 12 flows. The bypass flow channel 30 is disposed in the entering part 10a of the airflow meter 10. The bypass flow channel 30 has a passage flow channel 31 and a measurement flow channel 32, and the passage flow channel 31 and the measurement flow channel 32 are defined by an internal space 24a of the housing main body 24. The intake passage 12 may be referred to as a main passage, and the bypass flow channel 30 may be referred to as a sub-passage. In FIG. 3, the O-ring 26 is not shown.

The passage flow channel 31 penetrates through the housing main body 24 in the depth direction Z. The passage flow channel 31 has an inflow port 33 as an upstream end portion and an outflow port 34 as a downstream end portion. The inflow port 33 and the outflow port 34 are aligned in the depth direction Z, and the depth direction Z corresponds to an alignment direction. The measurement flow channel 32 is a branch flow channel branched from an intermediate portion of the passage flow channel 31, and the sensing portion 22 is provided in the measurement flow channel 32. The measurement flow channel 32 has a measurement inlet 35 which is an upstream end portion of the measurement flow channel 32 and a measurement outlet 36 which is a downstream end portion of the measurement flow channel 32. A portion where the measurement flow channel 32 branches from the passage flow channel 31 is a boundary between the passage flow channel 31 and the measurement flow channel 32, and the measurement inlet 35 is included in the boundary. The measurement outlet 36 corresponds to a branch outlet.

The sensing portion 22 includes a circuit board and a detection element mounted on the circuit board, and is a chip-type flow sensor. The detection element has a heat generation portion such as a heat generation resistor and a temperature detection unit, and the sensing portion 22 outputs a detection signal according to a change in temperature caused by heat generation in the detection element. The sensing portion 22 corresponds to a sensing portion.

The airflow meter 10 has a sensor sub-assembly including the sensing portion 22, and the sensor sub-assembly is referred to as a sensor SA 40. The sensor SA 40 is accommodated in the housing main body 24. The sensor SA 40 includes an SA main body 41 in addition to the sensing portion 22. The SA main body 41 has a circuit chip for performing various processes on the detection signal of the sensing portion 22, a lead frame for supporting the circuit chip, a molded portion made of resin for protecting the circuit chip and the lead frame, and the like, and the sensing portion 22 is supported by the molded portion and the like. The sensor SA 40 may also be referred to as a detection unit or a sensor portion.

The sensing portion 22 outputs a detection signal corresponding to the airflow in the measurement flow channel 32 to the circuit chip, and the circuit chip calculates the flow rate by use the detection signal of the sensing portion 22. The calculation result of the circuit chip is the flow rate of the air measured by the airflow meter 10. An inflow port 33 and an outflow port 34 of the airflow meter 10 are disposed at the center position of the intake passage 12 in the height direction Y. The intake air flowing at the center position of the intake passage 12 in the height direction Y flows along the depth direction Z. In this example, because the depth direction Z and the passage direction a coincide with each other, a direction in which the intake air flows in the intake passage 12 substantially coincides with a direction in which the intake air flows in the passage flow channel 31. The sensing portion 22 is not limited to a thermal type flow rate sensor, and may be an ultrasonic type flow sensor, a Kalman vortex type flow sensor, or the like.

Figure 4:
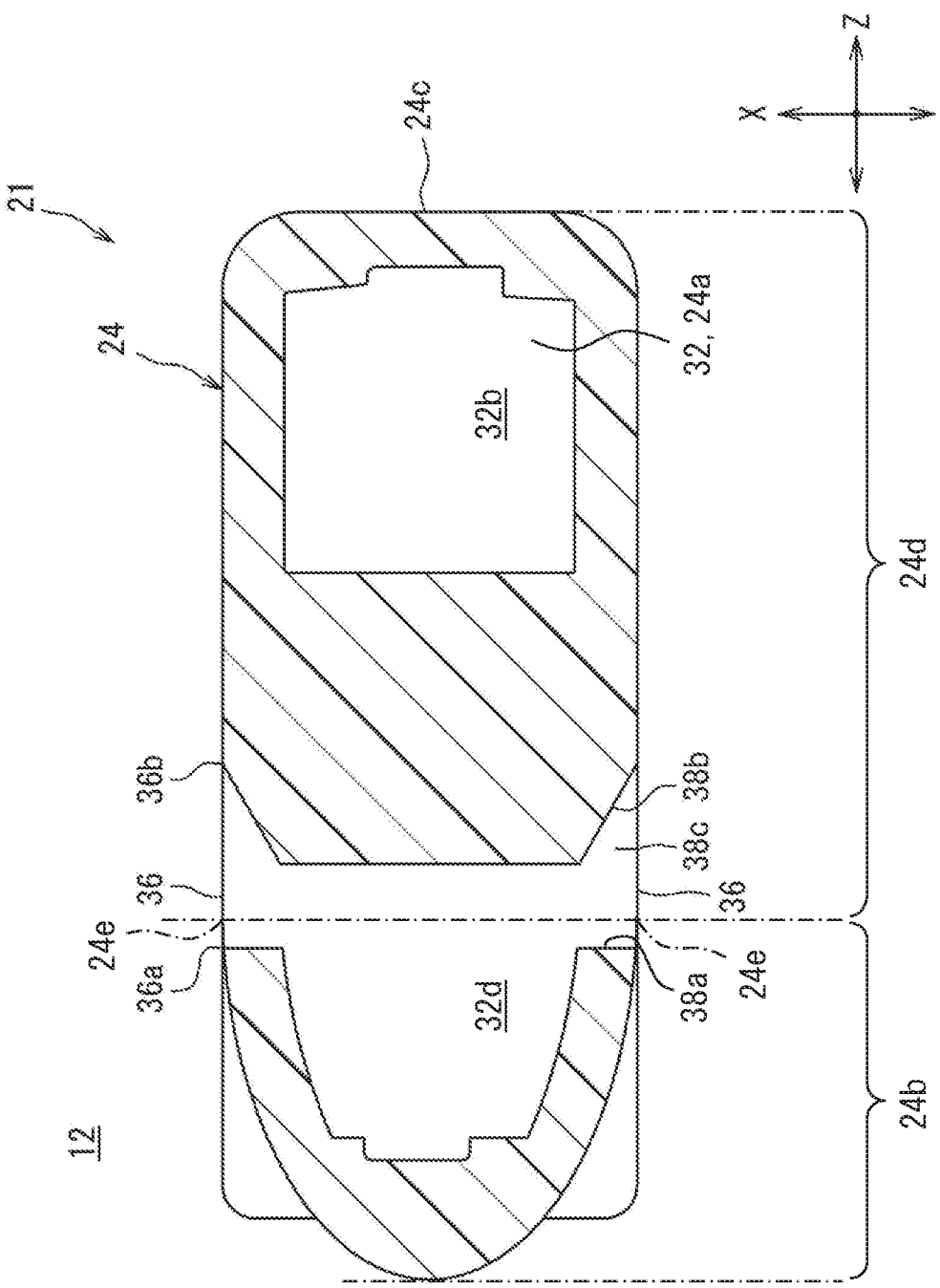
FIG. 4 is a cross-sectional view taken along a line IV-IV of FIG. 3.

As shown in FIG. 4, an outer peripheral surface of the housing main body 24 forming an outer peripheral surface of the housing 21 has an upstream outer surface 24b, a downstream outer surface 24c, and a pair of intermediate outer surfaces 24d. In the outer peripheral surface of the housing main body 24, the upstream outer surface 24b faces the upstream side of the intake passage 12, and the downstream outer surface 24c faces the downstream side of the intake passage 12. The pair of intermediate outer surfaces 24d face opposite sides in the width direction X, and are flat surfaces extending in the depth direction Z. The upstream outer surface 24b is inclined with respect to the intermediate outer surfaces 24d. In this case, the upstream outer surface 24b is an inclined surface curved so that a width dimension of the housing main body 24 in the width direction X is gradually reduced toward the upstream side in the intake passage 12.

The intermediate outer surfaces 24d are provided between the upstream outer surface 24b and the downstream outer surface 24c in the depth direction Z. In this case, the upstream outer surface 24b and the intermediate outer surface 24d are aligned in the depth direction Z, and the surface boundary 24e, which is a boundary between the upstream outer surface 24b and the intermediate outer surfaces 24d, extends in the height direction Y. The upstream outer surface 24b and the downstream outer surface 24c are a pair of end surfaces facing opposite to each other in the depth direction Z, and the upstream outer surface 24b corresponds to an inflow surface.

As shown in FIG. 3, the inflow port 33 is provided on the upstream outer surface 24b, and the outflow port 34 is provided on the downstream outer surface 24c. In this case, the inflow port 33 and the outflow port 34 are opened in opposite directions to each other. As shown in FIG. 4, the measurement outlet 36 is provided on both the upstream outer surface 24b and the intermediate outer surfaces 24d by being disposed at a position extending across the surface boundary 24e in the depth direction Z. In the measurement outlet 36, a portion disposed on the upstream outer surface 24b is opened toward the same side as the inflow port 33, and a portion disposed on the intermediate outer surfaces 24d is opened in the width direction X. In that case, the measurement outlet 36 faces a direction inclined toward the inflow port 33 with respect to the width direction X. In that case, the measurement outlet 36 is not opened toward the outflow port 34. In other words, the measurement outlet 36 is not opened toward the downstream side in the intake passage 12.

The measurement outlet 36 has a longitudinally long flat shape extending along the surface boundary 24e. The measurement outlet 36 is disposed at a position closer to the intermediate outer surfaces 24d with respect to the surface boundary 24e in the depth direction Z. In the measurement outlet 36, an area of a portion disposed on the intermediate outer surfaces 24d is larger than an area of a portion disposed on the upstream outer surface 24b. In this case, in the depth direction Z, a separation distance between the downstream end portion of the measurement outlet 36 and the surface boundary 24e is larger than a separation distance between the upstream end portion of the measurement outlet 36 and the surface boundary 24e.

The inner peripheral surface of the measurement flow channel 32 has defining surfaces 38a to 38c that define the measurement outlet 36. A through hole for defining the measurement outlet 36 is provided in the outer peripheral portion of the housing main body 24, and the defining surfaces 38a to 38c are included in an inner peripheral surface of the through hole. The upstream defining surface 38a of the defining surfaces 38a to 38c forms an upstream end portion 36a of the measurement outlet 36, and the downstream defining surface 38b forms a downstream end portion 36b of the measurement outlet 36. A pair of the connection defining surfaces 38c connect the upstream defining surface 38a and the downstream defining surface 38b, and the pair of the defining surfaces 38c are provided to sandwich the defining surfaces 38a and 38b.

The upstream defining surface 38a is orthogonal to the depth direction Z, and extends in the width direction X from the upstream end portion 36a of the measurement outlet 36 toward the inside of the housing main body 24. The downstream defining surface 38b is inclined with respect to the depth direction Z, and is an inclined surface extending straight toward the upstream outer surface 24b side from the downstream end portion 36b of the measurement outlet 36 toward the inside of the housing main body 24.

A flow of the intake air generated on the outer peripheral side of the housing main body 24 in the intake passage 12 will be described in brief. In the air flowing toward the downstream side of the intake passage 12, an air reaching the upstream outer surface 24b of the housing main body 24 gradually changes a direction of the air while reaching the measurement outlet 36 by advancing along the upstream outer surface 24b which is an inclined surface. As described above, since the direction of the air is smoothly changed by the upstream outer surface 24b, a separation of the air is hardly generated in the vicinity of the measurement outlet 36. For that reason, the air flowing through the measurement flow channel 32 easily flows out of the measurement outlet 36, and the flow velocity in the measurement flow channel 32 easily stabilizes.

Further, the air flowing through the measurement flow channel 32 and flowing out from the measurement outlet 36 to the intake passage 12 flows along the downstream defining surface 38b, which is an inclined surface, so that the air easily flows toward the downstream side in the intake passage 12. In that case, when the air flowing out from the measurement outlet 36 along the downstream defining surface 38b joins the intake air flowing through the intake passage 12, a turbulence of the airflow such as a vortex flow is less likely to occur, so that the flow velocity in the measurement flow channel 32 is more likely to be stabilized.

As shown in FIG. 3, the measurement flow channel 32 has a folded shape folded back between the measurement inlet 35 and the measurement outlet 36. The measurement flow channel 32 has a branch path 32a branched from the passage flow channel 31, a guide path 32b for guiding the air flowing in from the branch path 32a toward the sensing portion 22, a detection path 32c provided with the sensing portion 22, and a discharge path 32d for discharging the air from the measurement outlet 36. In the measurement flow channel 32, the branch path 32a, the guide path 32b, the detection path 32c, and the discharge path 32d are disposed in the stated order from the upstream side.

The detection path 32c extends in the depth direction Z so as to be parallel to the passage flow channel 31, and is provided at a position separated from the passage flow channel 31 toward the protruding part 10b. The branch path 32a, the guide path 32b, and the discharge path 32d are provided between the detection path 32c and the passage flow channel 31. The guide path 32b and the discharge path 32d are parallel to each other by extending in the height direction Y from the detection path 32c toward the passage flow channel 31. The branch path 32a is provided between the guide path 32b and the passage flow channel 31, and corresponds to an inclined branch path inclined with respect to the passage flow channel 31. The branch path 32a extends from the measurement inlet 35 toward the outflow port 34 with respect to the depth direction Z, and is a straight flow channel. The discharge path 32d is provided closer to the outflow port 34 than the guide path 32b in the passage direction a, and extends from the measurement outlet 36 toward the detection path 32c.

In the intake passage 12, when pulsations such as intake pulsations or the like occur in a flow of the intake air due to an operation state of the engine or the like, in addition to a forward flow flowing from the upstream side, a backward flow flowing from the downstream side in the opposite direction to the forward flow may occur in association with the pulsations. In the intake passage 12, the inflow port 33 is opened toward the upstream side, the outflow port 34 is not opened toward the downstream side, the forward flow easily flows into the inflow port 33, and the backward flow is likely to flow into the outflow port 34. Further, in the intake passage 12, the measurement outlet 36 is not opened toward the downstream side, and backward flow does not easily flow into the measurement outlet 36. Further, a turbulence of the airflow is likely to occur in the periphery of the measurement outlet 36 due to the air flowing out from the measurement outlet 36, and the turbulence of the airflow also becomes a factor that makes it difficult for the backward flow to flow into the measurement outlet 36.

As shown in FIG. 5, the airflow meter 10 includes a processing portion 45 that processes a detection signal of the sensing portion 22. The airflow meter 10 is electrically connected to an ECU (Electronic Control Unit) 46. The ECU 46 corresponds to an internal combustion engine control device, and is an engine control device having a function of controlling the engine based on a detection signal from the airflow meter 10 and the like. The detection signal is an electric signal indicating an airflow corrected by the pulsation error correction portion 61, which will be described later.

The sensing portion 22 outputs an output signal corresponding to the airflow flowing through the measurement flow channel 32 to the processing portion 45. The output signal is an electric signal, a sensor signal, or a detection signal output from the sensing portion 22, and an output value indicating a value of the airflow is included in the output signal.

When a pulsation occurs in the airflow in the intake passage 12, the sensing portion 22 is affected by the pulsation, and an error of the true airflow occurs in the output value. In particular, the sensing portion 22 is susceptible to pulsation when a throttle valve is operated to a fully open side. Hereinafter, the error due to the pulsation is also referred to as pulsation error Err. The true airflow is an airflow that is not affected by pulsation.

The processing portion 45 measures the airflow based on the output value of the sensing portion 22, and outputs the measured airflow to the ECU 46. In that case, the processing portion 45 corresponds to a measurement control device and a measurement controller that measure the airflow. The processing portion 45 includes an arithmetic processing portion such as a CPU, and a storage device for storing a program and data. For example, the processing portion 45 is realized by a microcontroller having a storage device readable by a computer. The processing portion 45 performs various calculations with the execution of programs stored in the storage medium by the arithmetic processing device, measures the airflow, and outputs the measured airflow to the ECU 46.

A storage device is a non-transitory tangible storage medium for non-transitory storage of computer readable programs and data. The storage medium is realized by a semiconductor memory, a magnetic disk, or the like. The storage device can also be referred to as a storage medium. The processing portion 45 may include a volatile memory for temporarily storing data.

The processing portion 45 has a function of correcting the output value in which the pulsation error Err occurs. In other words, the processing portion 45 corrects the airflow of the output signal so as to approach the true airflow. Therefore, the processing portion 45 outputs to the ECU 46 the airflow obtained by correcting the pulsation error Err as the detection signal. It can also be conceivable that the processing portion 45 outputs an electric signal indicating the airflow to the ECU 46.

The processing portion 45 operates as multiple functional blocks by executing the program. The processing portion 45 includes, as functional blocks, a sensor output A/D converter 51, a sampling portion 52, and an output-airflow conversion table 53. The processing portion 45 performs A/D conversion on the output value output from the sensing portion 22 by the sensor output A/D converter 51. Then, the processing portion 45 samples the A/D converted output value by the sampling portion 52, and converts the output value into an airflow by the output-airflow conversion table 53.

The processing portion 45 includes, as functional blocks, a sampling portion 54, a local maximum determination portion 55, a pulsation maximum calculation portion 56, an average airflow calculation portion 57, a pulsation amplitude calculation portion 58, a frequency calculation portion 59 (frequency calculator), a pulsation error calculation portion 60, a pulsation error correction portion 61, and a post-correction airflow output portion 62. The average airflow calculation portion 57 corresponds to an average calculator, the pulsation amplitude calculation portion 58 corresponds to an amplitude calculator, and the pulsation error correction portion 61 corresponds to an airflow corrector.

Figure 8:
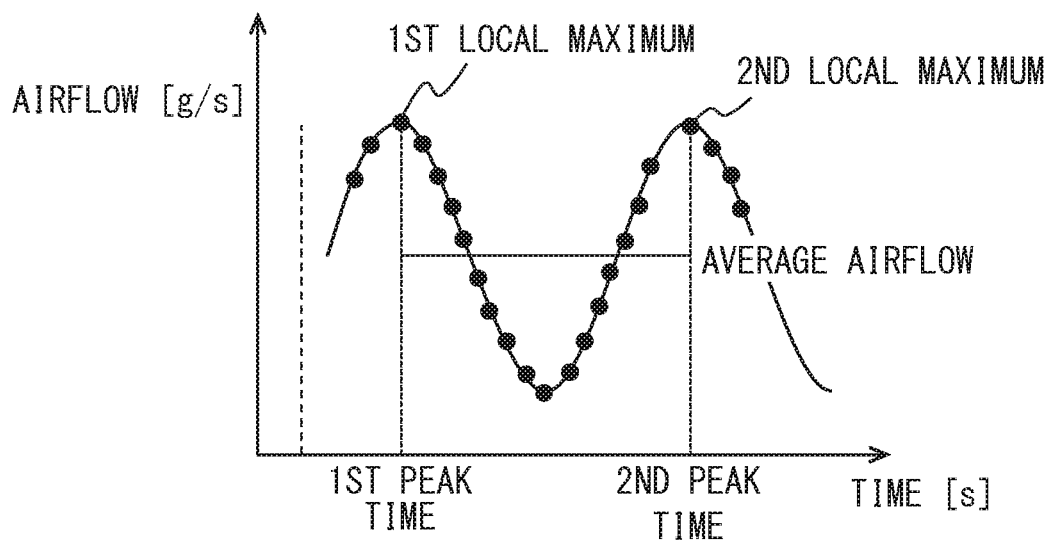
FIG. 8 is a diagram illustrating a method of determining a measurement period.

The sampling portion 54 acquires multiple sampling values between two local maximums determined by the local maximum determination portion 55. For example, as shown in FIG. 8, the local maximum determination portion 55 determines a sampling value at which the airflow corresponding to the sampling value is switched from an ascending value to a descending value among the multiple sampling values as a first local maximum. The local maximum determination portion 55 then determines a sampling value at which the airflow corresponding to the sampling value is switched from an ascending value to a descending value among the multiple sampling values as a second local maximum. In other words, the local maximum determination portion 55 determines the sampling value of a first peak time as the first local maximum, and determines the sampling value of a second peak time as a next peak time as a second local maximum. The sampling portion 54 acquires a sampling value between the first local maximum and the second local maximum.

This is because a measurement period, which is a calculation period of an average airflow Gave and a pulsation maximum Gmax, is determined, and the average airflow Gave and the pulsation maximum Gmax are calculated during the measurement period. In this example, the measurement period is between the first local maximum and the second local maximum. As the number of samplings is as large as possible, the average airflow Gave and the pulsation maximum Gmax can be calculated more accurately. The average airflow Gave is an average value of the airflows in a predetermined period. On the other hand, the pulsation maximum Gmax can be considered to be the maximum of the airflow when the air pulsates.

The pulsation maximum calculation portion 56 acquires the maximum of the airflow from the multiple sampling values acquired by the sampling portion 54. In other words, the pulsation maximum calculation portion 56 obtains the maximum of the airflow during the measurement period, that is, the pulsation maximum Gmax, which is a maximum flow rate, from the output value of the sensing portion 22. Hereinafter, the minimum of the airflow in the measurement period is also referred to as a pulsation minimum Gmin.

The pulsation maximum calculation portion 56 may obtain multiple local maximums in the airflow from the output value, and may obtain the pulsation maximum Gmax from an average value of the multiple local maximums. For example, the pulsation maximum calculation portion 56 acquires the first local maximum and the second local maximum, and calculates the average value of the first local maximum and the second local maximum as the pulsation maximum. As a result, the pulsation maximum calculation portion 56 can reduce the influence of any error in the first local maximum or the second local maximum. For that reason, the pulsation maximum calculation portion 56 can improve the calculation accuracy of the pulsation maximum Gmax. The pulsation maximum calculation portion 56 may acquire three or more local maximums, and calculate the pulsation maximum Gmax according to the average value of the three or more local maximums acquired.

The average airflow calculation portion 57 calculates an average value of the airflow according to the multiple sampling values acquired by the sampling portion 54. In other words, the average airflow calculation portion 57 calculates the average airflow Gave of the airflow in the measurement period according to the output values of the sensing portion 22.

Figure 9:
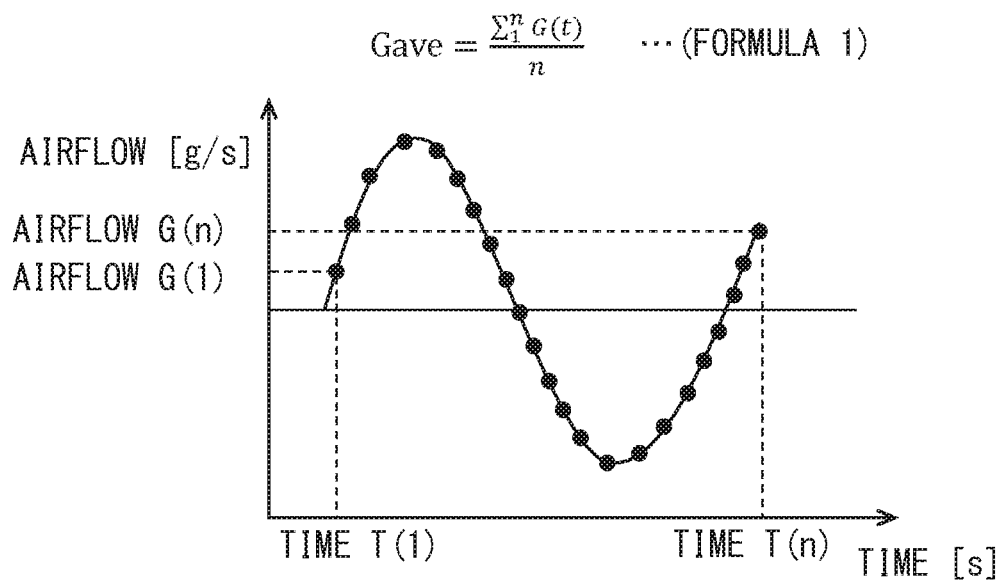
FIG. 9 is a diagram illustrating a method of calculating an average airflow.

The average airflow calculation portion 57 calculates the average airflow Gave by use of, for example, an integrated average. As an example, the calculation of the average airflow Gave will be described with reference to a waveform shown in FIG. 9. In this example, a period from a time T1 to a time Tn is set as a measurement period, the airflow at the time T1 is set as G1, and the airflow at the time Tn is set as Gn. The average airflow calculation portion 57 calculates the average airflow Gave by use of Formula 1 in FIG. 9. In that case, when the number of samples is larger as compared with a case in which the number of samples is smaller, the average airflow Gave can be calculated in which an influence of the pulsation minimum whose detection accuracy is relatively lower is reduced.

Average airflow Gave=(Pulsation Maximum+Pulsation Minimum)/2     (Formula 2)

The average airflow calculation portion 57 may calculate the average airflow Gave by averaging the pulsation minimum, which is the minimum of the airflow during the measurement period, and the pulsation maximum. In other words, the average airflow calculation portion 57 calculates the average airflow Gave by use of the above Formula 2.

Further, the average airflow calculation portion 57 may calculate the average airflow Gave without using the pulsation minimum whose detection accuracy is lower than the maximum of the airflow, or several airflows of the pulsation minimum and before and after the pulsation minimum. As will be described later, the processing portion 45 calculates the pulsation amplitudes Pa from the average airflow Gave and the pulsation maximum Gmax. Therefore, the processing portion 45 can calculate a pulsation amplitude Pa in which the influence of the pulsation minimum is reduced by causing the average airflow calculation portion 57 to calculate the average airflow Gave without using the pulsation minimum. In other words, when calculating the pulsation amplitude Pa, the processing portion 45 can improve the calculation accuracy of the pulsation amplitude Pa by calculating the pulsation amplitude Pa by use of the average airflow Gave and the pulsation maximum Gmax with relatively high detection accuracy without using the pulsation minimum with a low detection accuracy.

Figure 7:
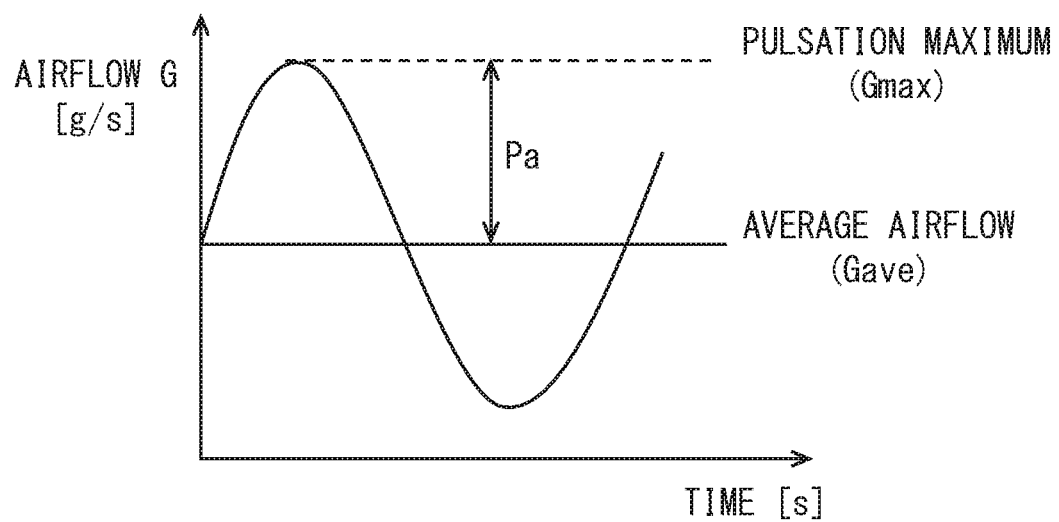
FIG. 7 is a diagram illustrating a method of calculating a pulsation amplitude.

As shown in FIG. 7, the pulsation amplitude calculation portion 58 calculates the pulsation amplitude Pa of the airflow by calculating a difference between the pulsation maximum Gmax and the average airflow Gave. In other words, the pulsation amplitude calculation portion 58 obtains not a total amplitude of the airflow but a half amplitude of the airflow. This is to reduce the influence of the pulsation minimum whose detection accuracy is relatively low as described above.

In this example, the sensing portion 22 can detect the airflow in both the forward direction and the reverse direction in the measurement flow channel 32. The output value of the sensing portion 22 becomes a positive value when the air flows in the measurement flow channel 32 in the reverse direction from the measurement inlet 35 to the measurement outlet 36, and becomes a negative value when the air flows in the forward direction from the measurement outlet 36 to the measurement inlet 35.

Figure 10:
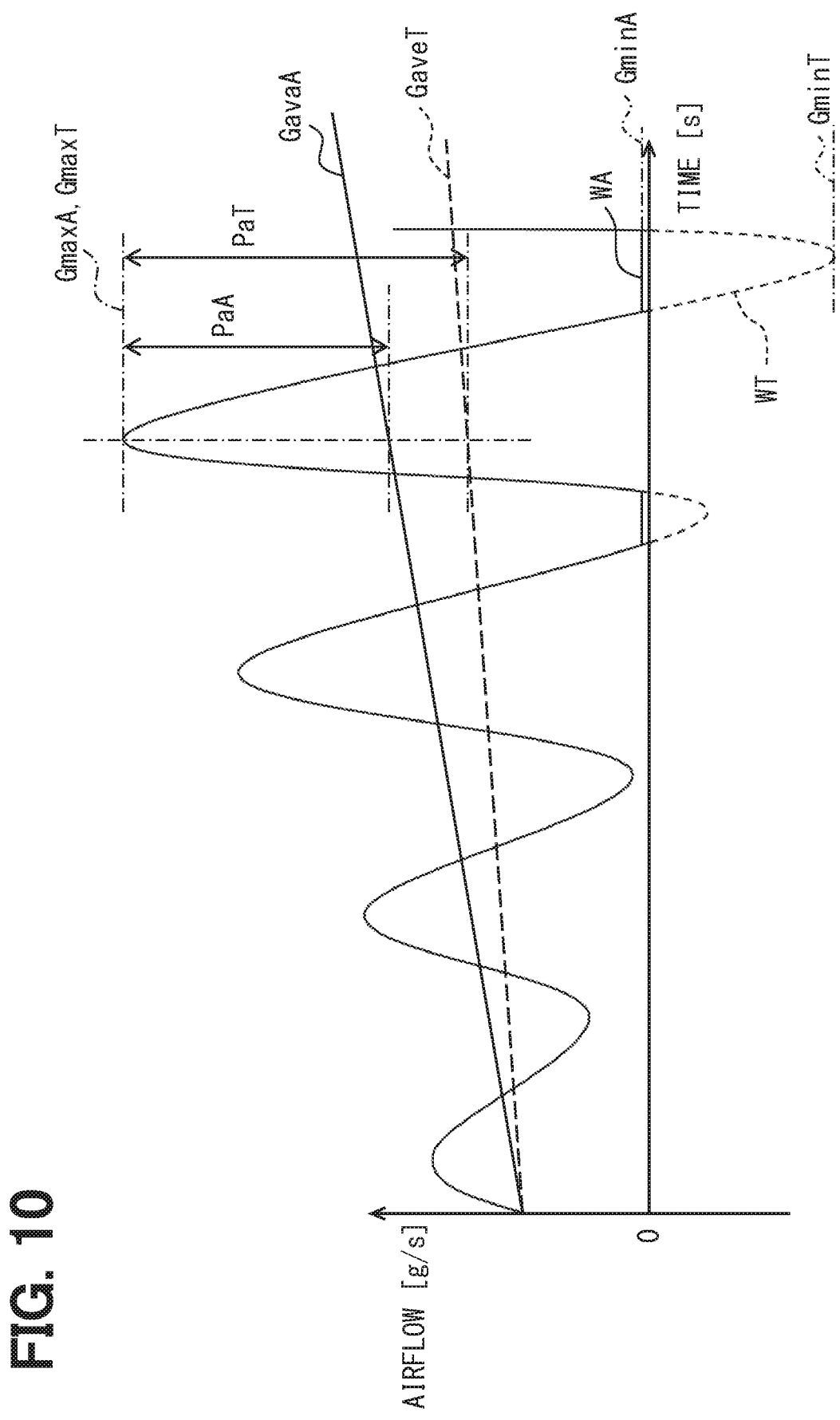
FIG. 10 is a diagram illustrating a difference between a waveform of an output signal and a true waveform when a backward flow occurs in an intake passage.

On the other hand, as described above, in the present embodiment, even if a backward flow occurs in the intake passage 12 outside the bypass flow channel 30, the backward flow does not easily flow in from the measurement outlet 36. For that reason, as shown in FIG. 10, even when a waveform WT indicating a true airflow in the intake passage 12 has a negative value indicating the occurrence of the backward flow, a waveform WA indicating the output value of the sensing portion 22 is unlikely to have a negative value. In this instance, a pulsation minimum GminA of the output signal is a value larger than a true pulsation minimum GminT, and accordingly, an average airflow GaveA of the output signal is likely to be a value larger than the true average airflow GaveT. On the other hand, the pulsation maximum GmaxA of the output signal is less likely to greatly increase or decrease with respect to the true pulsation maximum GmaxT depending on the presence or absence of the backward flow. For that reason, the pulsation amplitude PaA of the output signal is likely to be smaller than the true pulsation amplitude PaT.

Figure 11:
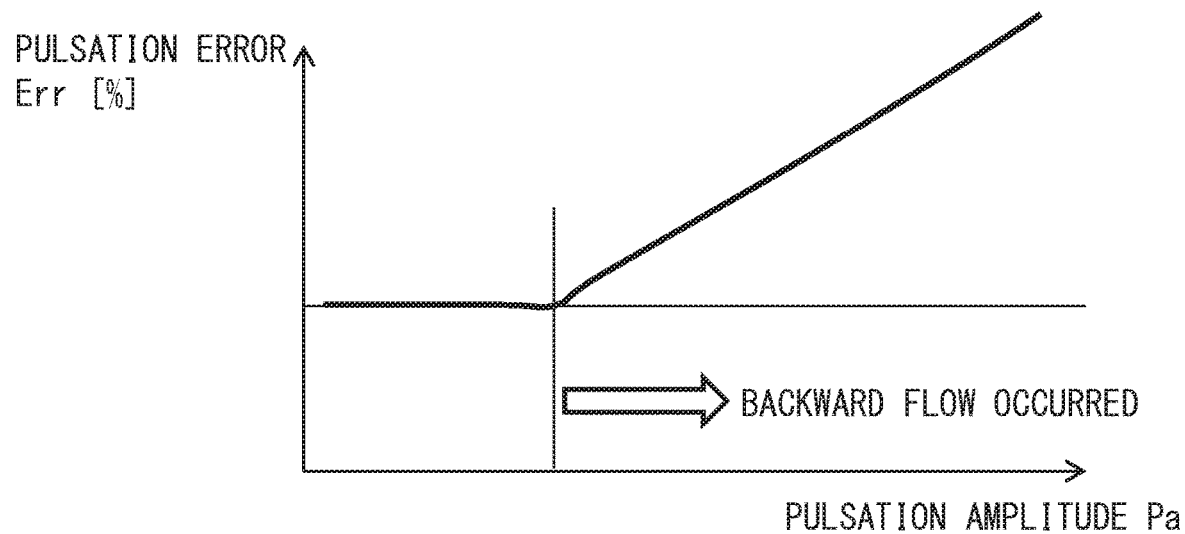
FIG. 11 is a diagram illustrating a pulsation characteristic showing a relationship between a pulsation amplitude and a pulsation error.

As can be seen from a waveform in FIG. 10, when pulsation occurs in the airflow, the pulsation amplitude Pa is likely to increase more as the average airflow Gave increases more. In the pulsation characteristic showing a relationship between the pulsation amplitude Pa and the pulsation error Err, as shown in FIG. 11, the pulsation error Err becomes larger as the pulsation amplitude Pa is larger. In particular, in the present embodiment, the pulsation error Err tends to be larger in the case where the backward flow occurs than in the case where the backward flow does not occur because the backward flow does not easily flow into the measurement outlet 36. When the backward flow occurs, the pulsation amplitude Pa and the pulsation error Err are substantially proportional to each other.

Figure 12:
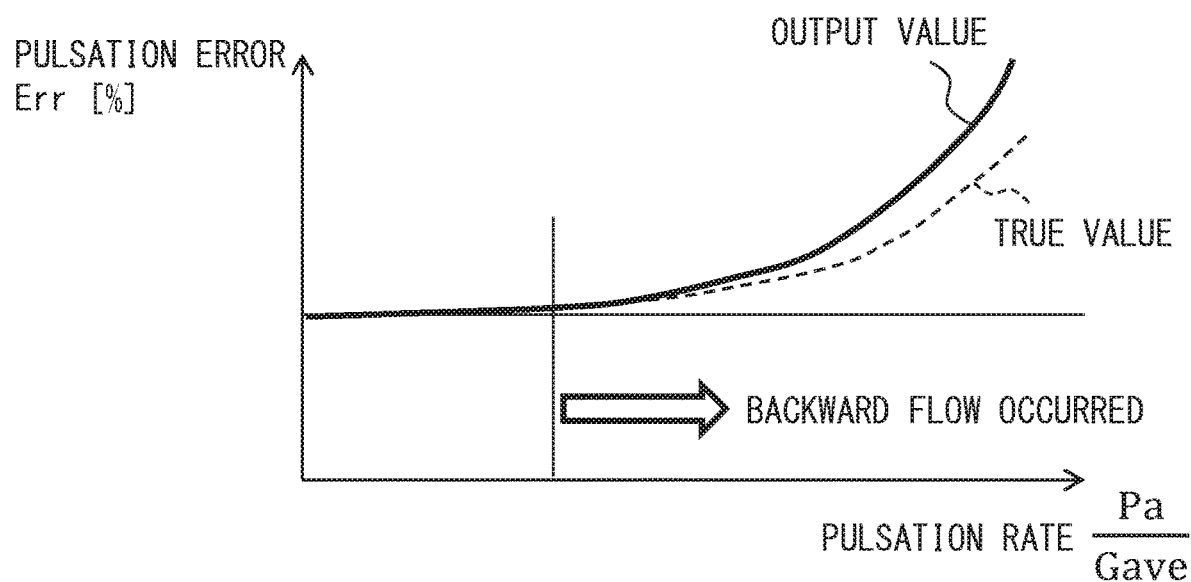
FIG. 12 is a diagram illustrating a characteristic showing a relationship between a pulsation rate and a pulsation error.

On the other hand, in the characteristic showing a relationship between the pulsation rate and the pulsation error Err, as shown in FIG. 12, as the pulsation rate increases, an increase rate of the pulsation error Err increases. The pulsation rate is a value obtained by dividing the pulsation amplitude Pa by the average airflow Gave, and the pulsation rate can also be referred to as a pulsation amplitude ratio. As described above, when pulsation occurs in the airflow, the pulsation amplitude PaA of the output signal becomes smaller than the true pulsation amplitude PaT, while the average airflow GaveA of the output signal becomes larger than the true average airflow GaveT. For that reason, the pulsation rate (solid line in FIG. 12) of the output signal becomes smaller than the true pulsation rate (dashed line in FIG. 12). In that case, since the rate of change of the pulsation error Err to the pulsation rate of the output signal becomes larger than the rate of change of the pulsation error Err to the true pulsation rate, if the pulsation rate of the output signal slightly increases or decreases due to an error or the like, the pulsation error Err greatly increases or decreases with the increase or decrease in the pulsation rate. Therefore, unlike the present embodiment, in the configuration in which the correction of the airflow is performed by use of the characteristics of the pulsation rate and the pulsation error Err instead of the pulsation amplitude Pa, it is considered that the acquisition accuracy of the pulsation error Err is lowered, as a result of which the correction accuracy of the flow rate is lowered.

Figure 13:
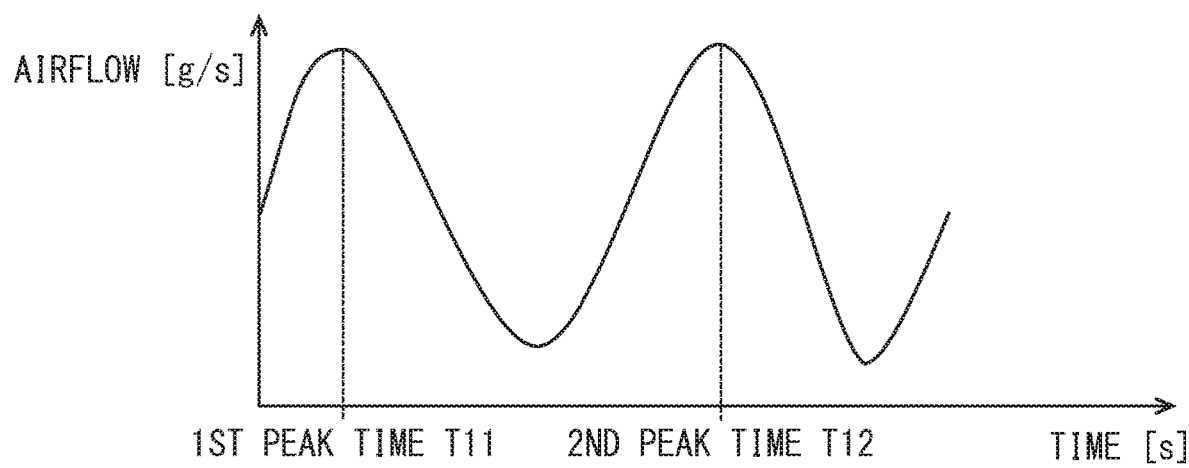
FIG. 13 is a diagram illustrating a method of calculating a pulsation frequency.

The frequency calculation portion 59 calculates a pulsation frequency F according to the multiple sampling values acquired by the sampling portion 54. For example, as shown in FIG. 13, the frequency calculation portion 59 calculates the pulsation frequency F based on an interval between two peaks. In the example of FIG. 13, a time of a first peak is assumed to be a first peak time T11, and a time of a second peak is assumed to be a second peak time T12. In that case, the pulsation frequency F[Hz]=1/(T12−T11). Therefore, the frequency calculation portion 59 can obtain the pulsation frequency F by calculating 1/(T12−T11).

Figure 14:
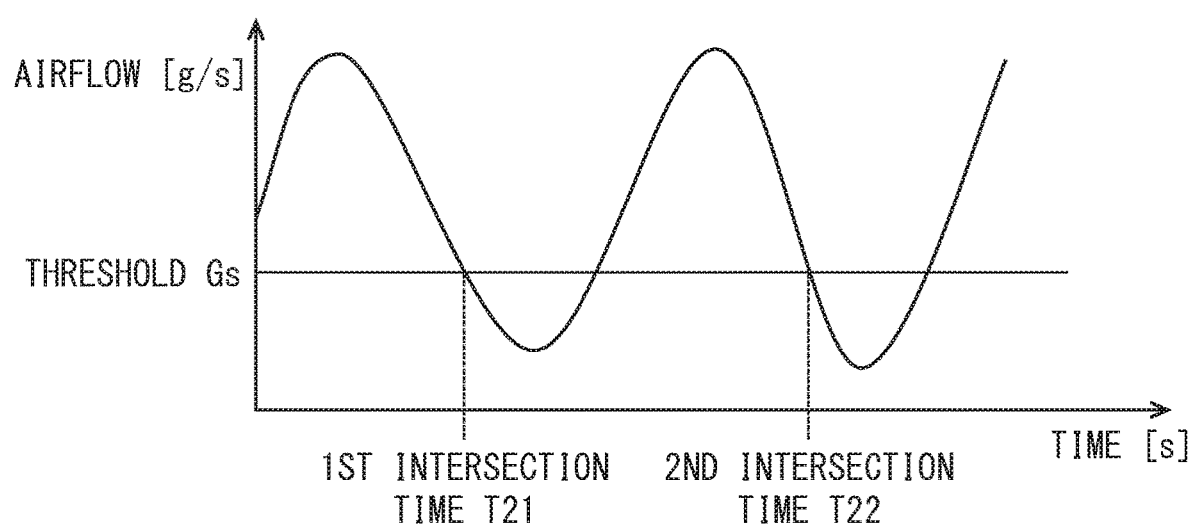
FIG. 14 is a diagram illustrating another calculation method of the pulsation frequency.

Further, as shown in FIG. 14, the frequency calculation portion 59 may calculate the pulsation frequency F based on a time spanning a threshold Gs. In the example of FIG. 14, a first time at which the pulsation frequency F intersects with the threshold Gs is set as a first intersection time T21, and a second time at which the pulsation frequency F intersects with the threshold Gs is set as a second intersection time T22. In that case, the pulsation frequency F[Hz]=1/(T22−T21). Therefore, the frequency calculation portion 59 can obtain the pulsation frequency F by calculating 1/(T22−T21). Further, the frequency calculation portion 59 may calculate the pulsation frequency F by Fourier-transform.

The pulsation error calculation portion 60 calculates the pulsation error Err of the airflow correlated with the pulsation amplitude Pa. The pulsation error calculation portion 60 predicts the pulsation error Err of the airflow correlated with the pulsation amplitude Pa by use of, for example, a map in which the pulsation amplitude Pa and the pulsation error Err are associated with each other. In other words, when the pulsation amplitude Pa is obtained by the pulsation amplitude calculation portion 58, the pulsation error calculation portion 60 extracts the pulsation error Err correlated with the obtained pulsation amplitude Pa from the map. It can also be considered that the pulsation error calculation portion 60 acquires the pulsation error Err correlated with the pulsation amplitude Pa. The pulsation error calculation portion 60 will be described in detail later.

As described above, the airflow meter 10 is attached to the intake pipe 12a defining the intake passage 12. Therefore, in the airflow meter 10, not only the pulsation error Err increases as the pulsation amplitude Pa increases due to the influence of a shape of the intake pipe 12a, but also the pulsation error Err may decrease as the pulsation amplitude Pa increases. For that reason, in the airflow meter 10, a relationship between the pulsation amplitude Pa and the pulsation error Err may be able to be expressed by a function. Therefore, the airflow meter 10 is preferable because an accurate pulsation error Err can be predicted by use of the map as described above. In the map, the multiple pulsation amplitudes Pa may be associated with a correction amounts Q correlated with the respective pulsation amplitudes Pa.

However, in some cases, the airflow meter 10 can express the relationship between the pulsation amplitude Pa and the pulsation error Err by a function, for example, when the sensing portion 22 is directly disposed in a main air passage. In that case, the airflow meter 10 may calculate the pulsation error Err by use of this function. Since the airflow meter 10 does not need to have a map by calculating the pulsation error Err by use of the function, a capacity of the storage device can be reduced. This also applies to the following embodiments. In other words, in the following embodiment, the pulsation error Err may be obtained by use of a function instead of the map.

The pulsation error Err is a difference between the uncorrected airflow obtained by the output value and the true airflow. In other words, the pulsation error Err corresponds to a difference between the airflow whose output value is converted by the output-airflow conversion table 53 and the true airflow. Therefore, the correction amount Q for bringing the amount of air before correction closer to the true airflow can be obtained if the pulsation error Err is known.

The pulsation error correction portion 61 corrects the airflow so that the pulsation error Err becomes small by use of the pulsation error Err predicted by the pulsation error calculation portion 60. In other words, the pulsation error correction portion 61 corrects the airflow so that the airflow affected by the pulsation approaches the true airflow. In this example, the average airflow Gave is adopted as an object to be corrected for the airflow.

For example, the pulsation error correction portion 61 obtains the correction amount Q from the predicted pulsation error Err by use of a calculation, a map in which the pulsation error Err and the correction amount Q are associated with each other, or the like. For example, the pulsation error correction portion 61 can correct the airflow so that the pulsation error Err becomes small by adding the correction amount Q to the average airflow Gave.

In other words, when the correction amount Q is negative Q1, the pulsation error correction portion 61 adds negative Q1 to the average airflow Gave, that is, subtracts Q1 from the average airflow Gave, thereby being capable of obtaining the corrected airflow in which the pulsation error Err is reduced. When the correction amount Q is positive Q2, the pulsation error correction portion 61 adds Q2 to the average airflow Gave, thereby being capable of obtaining a corrected airflow in which the pulsation error Err is reduced. However, the present disclosure is not limited to the above configuration, and any configuration can be adopted as long as the airflow can be corrected so that the pulsation error Err becomes small.

In the present embodiment, the airflow is corrected so that the pulsation error Err becomes small with respect to the average airflow Gave. However, the present disclosure is not limited to the above configuration. The pulsation error correction portion 61 may correct the airflow so that the pulsation error Err becomes small with respect to the value before the calculation is performed by the average airflow calculation portion 57.

The post-correction airflow output portion 62 outputs an electric signal indicating the airflow corrected by the pulsation error correction portion 61. In the present embodiment, the post-correction airflow output portion 62 that outputs the airflow corrected by the pulsation error correction portion 61 to the ECU 46 is employed.

Figure 6:
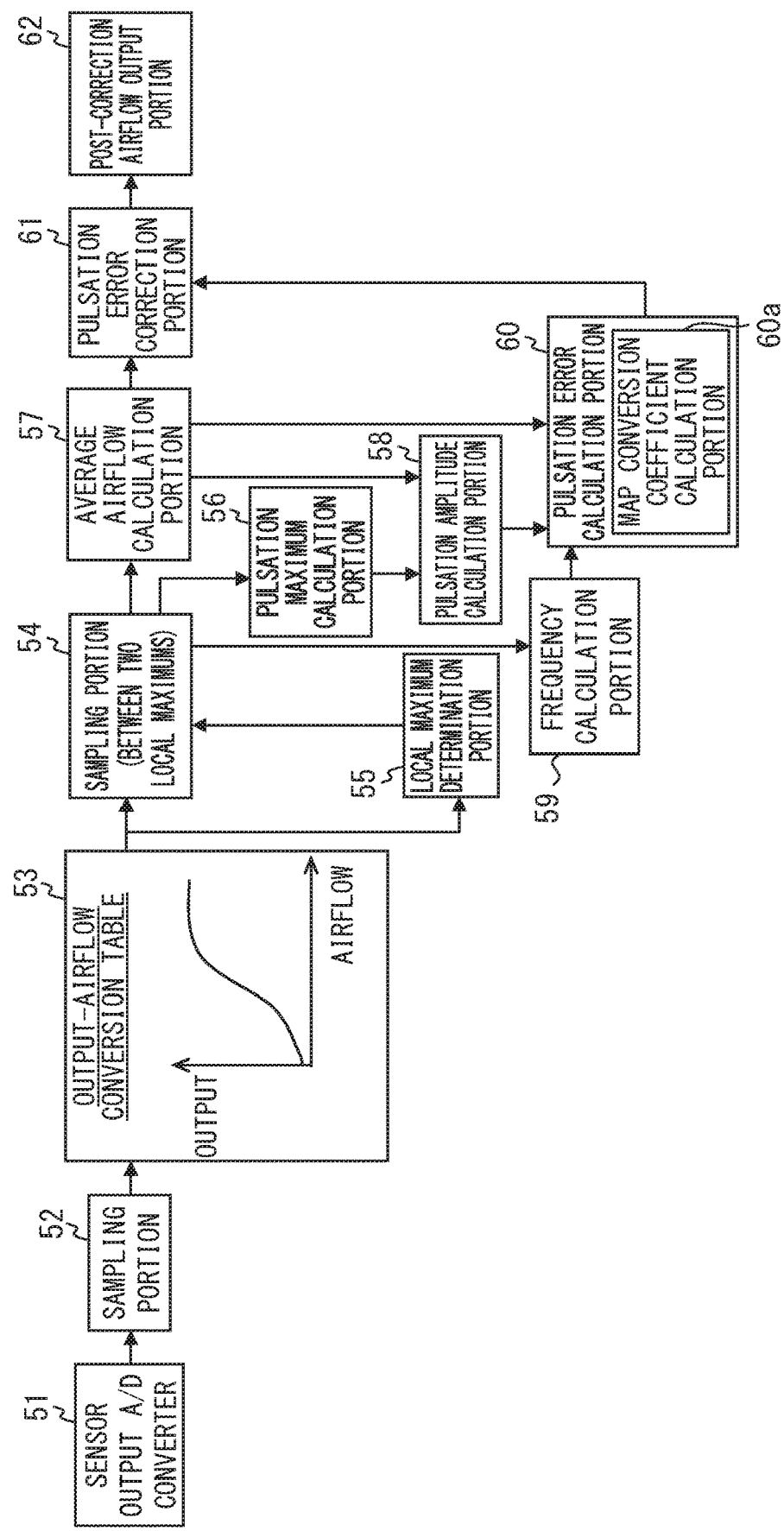
FIG. 6 is a block diagram showing a schematic configuration of a processing portion.

In this example, the pulsation error calculation portion 60 will be described with reference to FIGS. 6 and 15 to 19. As shown in FIG. 6, the average airflow Gave calculated by the average airflow calculation portion 57, the pulsation amplitude Pa calculated by the pulsation amplitude calculation portion 58, and the pulsation frequency F calculated by the frequency calculation portion 59 are input to the pulsation error calculation portion 60. The pulsation error calculation portion 60 calculates the pulsation error Err by use of the average airflow Gave, the pulsation amplitude Pa, and the pulsation frequency F.

$$\text{Err} = Ann \times Pa + Bnn \qquad \text{(Formula 3)}$$

Figures 15, 16:
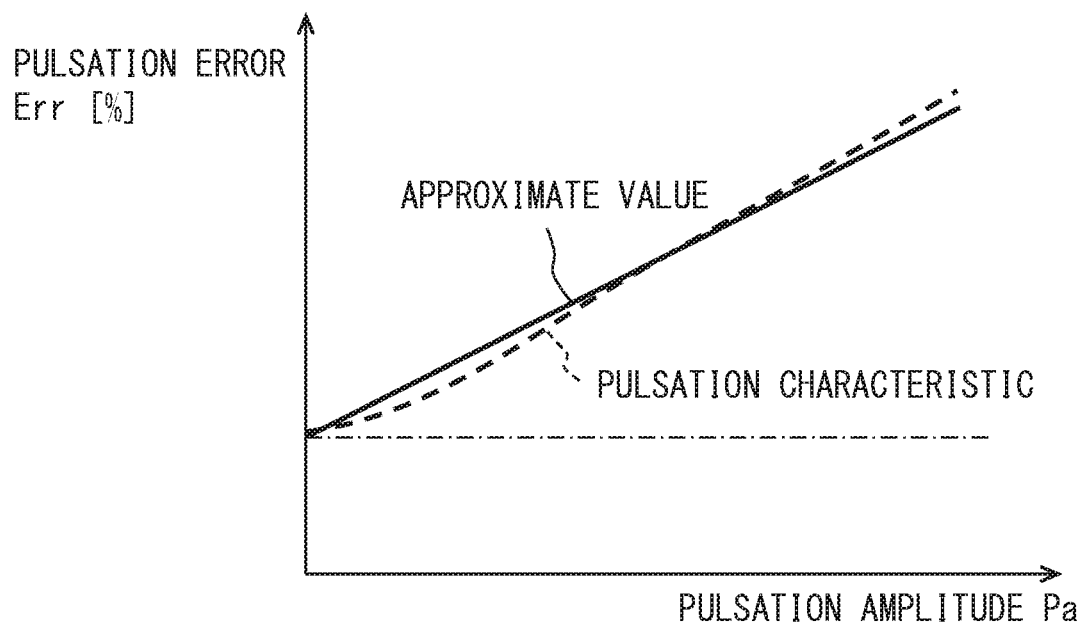
FIG. 15 is a graph showing a relationship between a pulsation characteristic and an approximate value.
FIG. 16 is a diagram showing a reference map.

As described above, in the pulsation characteristic, the pulsation amplitude Pa and the pulsation error Err are substantially proportional to each other, and an approximate line of the pulsation characteristic can be represented by a straight line as shown in FIG. 15. In the approximate line of the pulsation characteristic, a relationship of the above Formula 3 is satisfied. The relational expression is an error prediction expression for predicting the pulsation error Err by use of the pulsation amplitude Pa, and in the error prediction expression, Ann is a slope of the approximate line, and Bnn is an intercept. In the pulsation characteristic, the pulsation error Err corresponds to a correction parameter.

The pulsation characteristic is set for each of combinations of the average airflow Gave and the pulsation frequency F. In FIG. 16, the slope Ann and the intercept Bnn indicating the pulsation characteristic are set in the respective windows indicating the combinations of the average airflow Gave and the pulsation frequency F. When such a map indicating a relationship between the average airflow Gave and the pulsation frequency F and the pulsation characteristics is referred to as a reference map, the reference map is a two-dimensional map and is stored in the storage device of the processing portion 45. In the reference map, the pulsation characteristic is set for a predetermined value determined in advance for each of the average airflow Gave and the pulsation frequency F. In FIG. 16, the map values of the average airflow Gave set in the reference map are indicated as G1 to Gn, and the map values of the pulsation frequencies F are indicated as F1 to Fn. The pulsation characteristic corresponds to a correction characteristic, and the reference map corresponds to reference information. The reference map may be referred to as a correction map, and the reference information may be referred to as correction information.

The reference map can be created by confirming the relationship between the pulsation amplitude Pa and the pulsation error Err correlated with the pulsation amplitude Pa by an experiment or simulation using an actual machine. In other words, the pulsation error Err is a value obtained for each pulsation amplitude Pa when an experiment or simulation using an actual machine is performed by changing the value of the pulsation amplitude Pa. It should be noted that other maps in the embodiment can be created by experiments using actual machines, simulations, or the like, similarly to the reference maps.

As described above, in the waveforms obtained from the output value of the sensing portion 22, as the average airflow Gave is larger, the pulsation amplitude Pa becomes larger. In other words, as the average airflow Gave is smaller, the pulsation amplitudes Pa is smaller. For that reason, as shown in FIG. 17, in the pulsation characteristic, in addition to the slope Ann and the intercept Bnn, an upper limit value Pann of the pulsation amplitudes Pa is set for each of combinations of the average airflow Gave and the pulsation frequency F. The pulsation error Err also has an upper limit value Errnn corresponding to the upper limit value Pann of the pulsation amplitude Pa.

For example, in the reference map, the pulsation characteristics corresponding to the map values G1 and F1 of the average airflow Gave and the pulsation frequency F have a slope A11, an intercept B11, an upper limit value Pa11 of the pulsation amplitude Pa, and an upper limit value Err11 of the pulsation error Err. In the same manner, the pulsation characteristics corresponding to the map values G2 and F1 have a slope A12, an intercept B12, an upper limit value Pa12 of the pulsation amplitude Pa, and an upper limit value Err12 of the pulsation error Err.

When the average airflow GaveA of the output signal does not correspond to any of the map values G1 to Gn of the average airflow Gave, the pulsation error Err may be calculated by use of the pulsation characteristics of the values of the map values G1 to Gn close to the average airflow GaveA of the output signal. However, in the above method, since the pulsation characteristic used for calculating the pulsation error Err is not strictly the pulsation characteristic corresponding to the average airflow GaveA of the output signal, there is a fear that the calculation error of the pulsation error Err becomes large. When a pulsation characteristic corresponding to a value of the map values G1 to Gn smaller than the average airflow GaveA of the output signal is selected, the pulsation amplitude PaA of the output signal is likely to be larger than the upper limit value of the pulsation amplitude Pa of the selected pulsation characteristic. In that case, since the pulsation error Err corresponding to the pulsation amplitude PaA of the output signal is not included in the selected pulsation characteristic, there is a concern that the calculation accuracy may be lowered even if the pulsation error Err cannot be calculated or can be calculated.

Therefore, in the present embodiment, the pulsation error calculation portion 60 performs the pulsation error calculation process of calculating the pulsation error Err by use of multiple pulsation characteristics in the reference map. The pulsation error calculation process will be described with reference to a flowchart of FIG. 18. The pulsation error calculation process is a process of calculating the pulsation error ErrA by use of the reference map in a state where the average airflow GaveA, the pulsation frequency FA, and the pulsation amplitude PaA of the output signal have been acquired.

Figure 18:
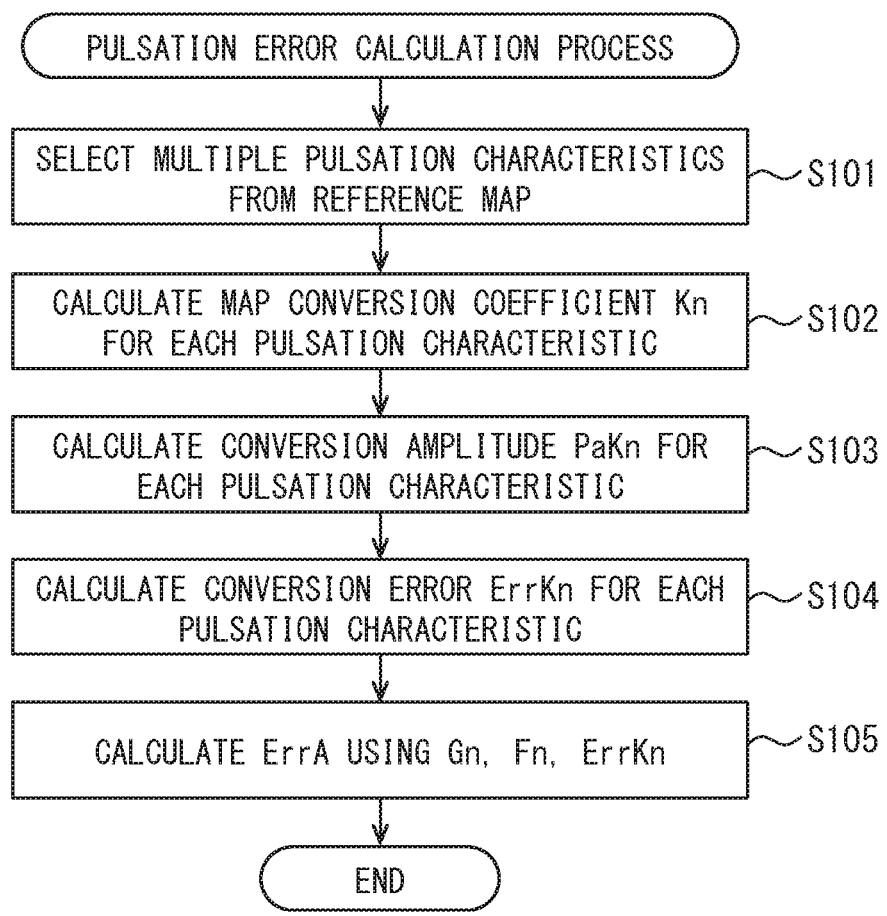
FIG. 18 is a flowchart showing a procedure of a pulsation error calculation process.

In FIG. 18, in Step S101, multiple pulsation characteristics are selected from the reference map. In this example, a map value close to the average airflow GaveA of the output signal is selected from the map values G1 to Gn of the average airflow Gave, and a map value close to the pulsation frequency FA of the output signal is selected from the map values F1 to Fn of the pulsation frequency F. Specifically, at least two map values counting from the map value smallest in difference from the output signal are selected from the map values G1 to Gn of the average airflow Gave. Similarly, at least two map values counting from the map value smallest in difference from the pulsation frequency FA of the output signal are selected from the map values F1 to F2 of the pulsation frequency F. For example, four pulsation characteristics are selected by selecting two map values for each of the average airflow Gave and the pulsation frequency F.

$$Kn=Gn/GaveA \quad \text{(Formula 4)}$$

In Step S102, a map conversion coefficient Kn is calculated for each of the selected pulsation characteristics. The map conversion coefficient Kn is a ratio of the map value Gn of the average airflow Gave corresponding to the selected pulsation characteristics and the average airflow GaveA of the output signal, and is a value obtained by dividing the map value Gn of the average airflow Gave by the average airflow GaveA of the output signal. In this case, the above Formula 4 for calculating the map conversion coefficient Kn is satisfied. The map conversion coefficient Kn corresponds to a conversion coefficient. The map conversion coefficient calculation portion 60a has a function of calculating the map conversion coefficient Kn in the processing portion 45, and the map conversion coefficient calculation portion 60a is included in the pulsation error calculation portion 60 (see FIG. 6).

$$PaKn=PaA*Kn \quad \text{(Formula 5)}$$

In Step S103, a conversion amplitude PaKn is calculated for each of the selected pulsation characteristics. The conversion amplitude PaKn is a value included in the selected pulsation characteristic, and is a value smaller than the upper limit value Pann of the pulsation amplitude Pa in the pulsation characteristic. The conversion amplitude PaKn is calculated by a product of the pulsation amplitude PaA of the output signal and the map conversion coefficient Kn. In this instance, Formula 5 for calculating the conversion amplitude PaKn is satisfied.

$$ErrKn=Ann \times PaKn+Bnn \quad \text{(Formula 6)}$$

In Step S104, a conversion error ErrKn is calculated for each of the selected pulsation characteristic. The conversion error ErrKn is a value corresponding to the conversion amplitude PaKn in the selected pulsation characteristic, and is a value smaller than the upper limit value Errnn of the pulsation error Err in the pulsation characteristic. In this instance, Formula 6 for calculating the conversion error ErrKn is satisfied. The conversion error ErrKn corresponds to a correction parameter.

In Step S105, the post-conversion pulsation error ErrA is calculated by use of the map value Gn of the average airflow Gave, the map value Fn of the pulsation frequency F, and the conversion error ErrKn acquired for each of the selected pulsation characteristics. In this example, first, in each of the selected pulsation characteristics, a correlation point Xnn indicating a relationship among the map value Gn of the average airflow Gave, the map value Fn of the pulsation frequency F, and the conversion error ErrKn is acquired. A pulsation error ErrA corresponding to the pulsation amplitude PaA in the output value is calculated by interpolating the multiple correlation points Xnn.

For example, when there are four selected pulsation characteristics, a virtual flat surface passing through the four correlation points Xnn acquired in accordance with those pulsation characteristics is set as an interpolation plane, thereby interpolating those correlation points Xnn. In the interpolation plane, the pulsation error Err having the average airflow GaveA of the output signal and the pulsation frequency FA of the output signal is acquired as the converted pulsation error ErrA. The converted pulsation error ErrA corresponds to an interpolation parameter.

The pulsation error calculation portion 60 of the processing portion 45 has a function of executing each step of the pulsation error calculation process. The function of executing the process of Step S101 corresponds to a characteristic selector, the function of executing the process of Step S102 corresponds to a coefficient calculator and a map conversion coefficient calculation portion 60a, and the function of executing the process of Step S103 corresponds to an amplitude conversion portion. The function of executing the process of Step S104 corresponds to a correction parameter acquirer, and the function of executing the process of Step S105 corresponds to an interpolation parameter acquirer.

Next, a description will be given of an example in which the conversion pulsation error ErrA is calculated by the pulsation error calculation process with reference to FIG. 17 and FIG. 18. In the following description, it is assumed that the average airflow GaveA of the output signal is a value between the map values G1 and G2 of the average airflow Gave in the reference map, and four pulsation characteristics corresponding to the map values G1, G2, F1, and F2 are selected in the above-mentioned Step S101. In this example, those pulsation characteristics are referred to as M11, M12, M21, and M22.

The map conversion coefficient Kn calculated in the above-mentioned Step S102 is a map conversion coefficient K1 in which the pulsation characteristics M11 and M21 are common, and a map conversion coefficient K2 in which the pulsation characteristics M12 and M22 are common.

Similarly, the conversion amplitude PaKn calculated in the above-mentioned Step S103 is a conversion amplitude in which the pulsation characteristics M11 and M21 are common and a conversion amplitude PaK2 in which the pulsation characteristics M12 and M22 are common. In that case, as shown in FIG. 17, in the pulsation characteristic M11, the conversion amplitude PaK1 becomes smaller than the converted pulsation error ErrA, and therefore becomes smaller than the upper limit value Pa11. In the pulsation characteristics M12, the conversion amplitude PaK2 is larger than the converted pulsation error ErrA within a range not larger than the upper limit value Pa12.

The conversion error ErrKn calculated in the above-mentioned Step S104 is a conversion error ErrK1 in which the pulsation characteristics M11 and M21 are common, and a conversion error ErrK2 in which pulsation characteristics M12 and M22 are common. In this instance, as shown in FIG. 17, the pulsation error Err corresponding to the conversion amplitude PaK1 becomes the conversion error ErrK1 in the pulsation characteristic M11, and the pulsation error Err corresponding to the conversion amplitude PaK2 becomes the conversion error ErrK2 in the pulsation characteristic M12.

Figure 19:
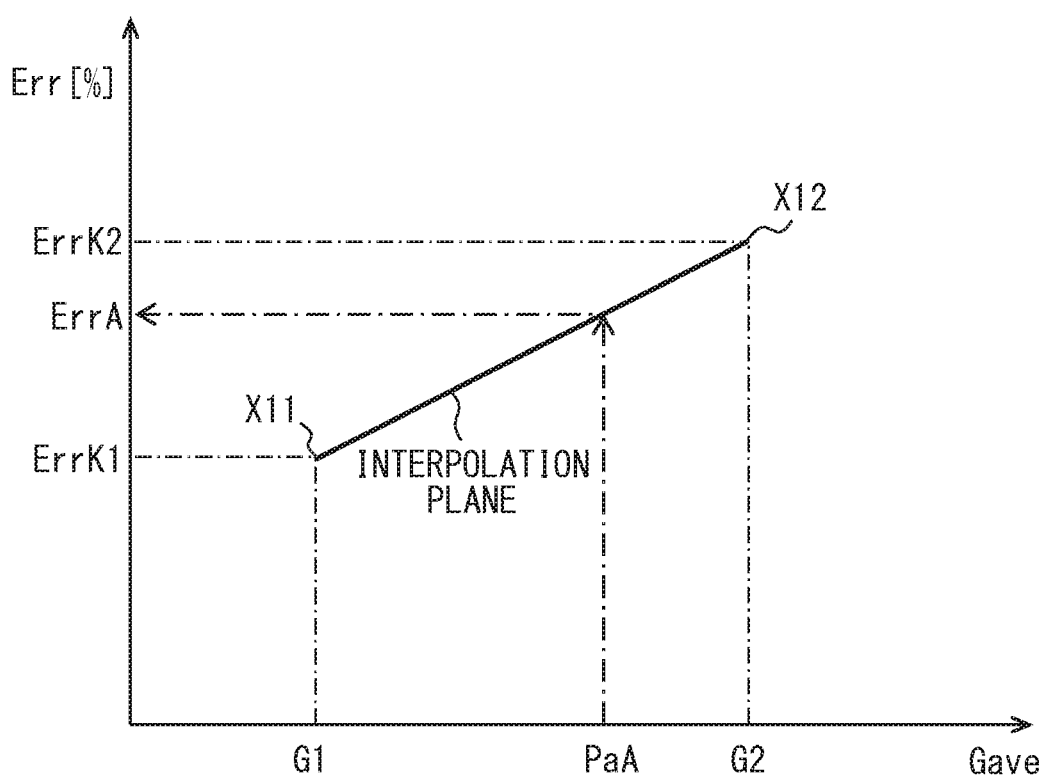
FIG. 19 is a diagram showing a relationship between multiple correlation points and an interpolation plane.

The correlation point Xnn acquired in the above-mentioned Step S105 is the correlation points X11, X12, X21, and X22 for the pulsation characteristics M11, M12, M21, and M22, respectively. Also, the interpolation plane set in Step S105 passes through all of the correlation points X11, X12, X21, and X22. As shown in FIG. 19, the pulsation error Err corresponding to the pulsation amplitude PaA of the output signal is acquired as the converted pulsation error ErrA on the correlation surface. In FIG. 19, the pulsation amplitude Pa is taken on the X-axis, the pulsation error Err is taken on the Y-axis, and the pulsation frequency F is taken on the Z-axis. It is assumed that the correlation points X21 and X22 are at positions deviated in the Z-axis direction from the correlation points X11 and X12, and illustration of those correlation points X21 and X22 is omitted. The pulsation amplitude Pa, the pulsation error Err, and the pulsation frequency F may be set to one of the three axes.

According to the present embodiment described so far, the pulsation amplitude Pa used for calculating the pulsation error Err through the pulsation characteristic is different from the pulsation rate and the pulsation amplitude ratio, and is not a value calculated with the average airflow Gave as a denominator. For that reason, even if the average airflow GaveA of the output signal becomes smaller than the true average airflow GaveT due to the difficulty of flowing into the measurement outlet 36 when the backward flow occurs in the intake passage 12, the pulsation amplitude PaA of the output signal is less likely to be smaller than the true pulsation amplitude PaT. In this instance, the degree of decrease of the pulsation amplitude PaA of the output signal with respect to the true pulsation amplitude PaT is smaller than the degree of decrease of the average airflow GaveA of the output signal with respect to the true average airflow GaveT. For that reason, the pulsation error Err is calculated by use of the pulsation amplitude Pa, the calculation accuracy of the pulsation error Err can be enhanced. Therefore, in the present embodiment in which the correction of the airflow is performed by use of the pulsation error Err, the correction accuracy of the airflow when the backward flow of the air occurs in the intake passage 12 can be improved.

In addition, the robustness of the argument calculation can be improved by use of the pulsation amplitude Pa instead of the pulsation rate in the circuit correction of pulsation characteristic using the pulsation conditions such as the average airflow Gave, the pulsation frequency F, and the pulsation amplitude Pa as arguments.

According to the present embodiment, the map conversion coefficient Kn is calculated for the pulsation characteristic selected from the multiple pulsation characteristics included in the reference map. For that reason, even if a value coincident with the average airflow GaveA of the output signal is not included in the map values G1 to Gn of the reference map, the pulsation amplitude PaA of the output signal can be converted into the conversion amplitude PaKn included in the pulsation amplitude Pa of the selected pulsation characteristic. In this instance, since the pulsation error Err corresponding to the conversion amplitude PaKn can be calculated as the conversion error ErrKn in the selected pulsation characteristic, the calculation accuracy of the conversion error ErrKn calculated through the pulsation characteristic can be enhanced. Therefore, the conversion error ErrKn with high calculation accuracy is used for the correction of the airflow, thereby being capable of improving the correction accuracy.

According to the present embodiment, since the multiple pulsation characteristics are selected in the reference map, the conversion error ErrKn can be calculated according to the pulsation amplitudes PaA of the output signal using each of the selected pulsation characteristics. As described above, since the multiple conversion errors ErrKn corresponding to the respective multiple pulsation characteristics are calculated, the correction accuracy of the airflow using the conversion error ErrKn can be avoided from depending on one pulsation characteristic. In other words, the correction accuracy can be enhanced by correcting the airflow using the multiple pulsation characteristics.

According to the present embodiment, the converted pulsation error ErrA is calculated by interpolating the conversion error ErrKn calculated for each of the multiple pulsation characteristics. For that reason, the calculation accuracy of the converted pulsation error ErrA can be improved as compared with a configuration in which the converted pulsation error ErrA is calculated by simply averaging the multiple conversion errors ErrKn.

According to the present embodiment, the pulsation characteristics corresponding to at least two map values counting from the map value smallest in the difference from the average airflow of the output signal among the map values G1 to Gn included in the reference map are selected. In this instance, the conversion amplitude PaKn and the conversion error ErrKn can be calculated by use of the pulsation characteristic close to the pulsation characteristic of the average airflow GaveA of the output signal among the multiple pulsation characteristics in the reference map. This makes it possible to improve the calculation accuracy of the conversion amplitudes PaKn and the conversion error ErrKn, and further makes it possible to improve the correction accuracy of the airflow.

According to the present embodiment, in the reference map, the pulsation characteristics correspond to both the map values G1 to Gn of the average airflow Gave and the map values F1 to Fn of the pulsation frequency F. As described above, since the pulsation characteristic is finely set in the reference map, the pulsation characteristic close to the pulsation characteristic of the air actually flowing through the intake passage 12 can be included in the reference map. For that reason, the calculation accuracy when the conversion amplitudes PaKn and the conversion error ErrKn are calculated using the pulsation characteristics can be enhanced.

According to the present embodiment, in the pulsation characteristic, since the correction parameter corresponding to the pulsation amplitude Pa is the pulsation error Err, the reliability of the pulsation characteristic included in the reference map can be enhanced. This is because the correlation between the pulsation amplitude Pa and the pulsation error Err is relatively strong because it is considered that the pulsation error Err becomes larger as the pulsation amplitude Pa is larger. For example, in a configuration in which the correction flow rate, which is the correction result obtained by correcting the airflow, is set as the correction parameter corresponding to the pulsation amplitude Pa in the pulsation characteristic, the correlation between the correction flow rate and the pulsation amplitude Pa is relatively weak, so that there is a concern that the reliability of the pulsation characteristic included in the reference map is lowered.

According to the present embodiment, a part of the measurement outlet 36 of the measurement flow channel 32 faces the opposite side to the outflow port 34, and the remaining part faces the width direction X. In other words, the measurement outlet 36 does not face the same side as the outflow port 34. In the above configuration, the backward flow generated in the intake passage 12 is less likely to flow into the measurement outlet 36, and a dynamic pressure due to the backward flow is less likely to be applied to the measurement flow channel. For that reason, when the backward flow occurs, there is a fear that the correction accuracy of the airflow is lowered because the difference between the average airflow GaveA of the output value and the true average airflow GaveT becomes large. On the other hand, as described above, the pulsation characteristics indicating the relationship between the pulsation amplitudes Pa and the pulsation errors Err without using the average airflow Gave are used for correcting the airflow. For that reason, even if the direction of the measurement outlet 36 is a direction in which the correction accuracy of the airflow is apt to be lowered at the time of occurrence of the backward flow, the correction accuracy can be enhanced.

Second Embodiment

Figure 20:
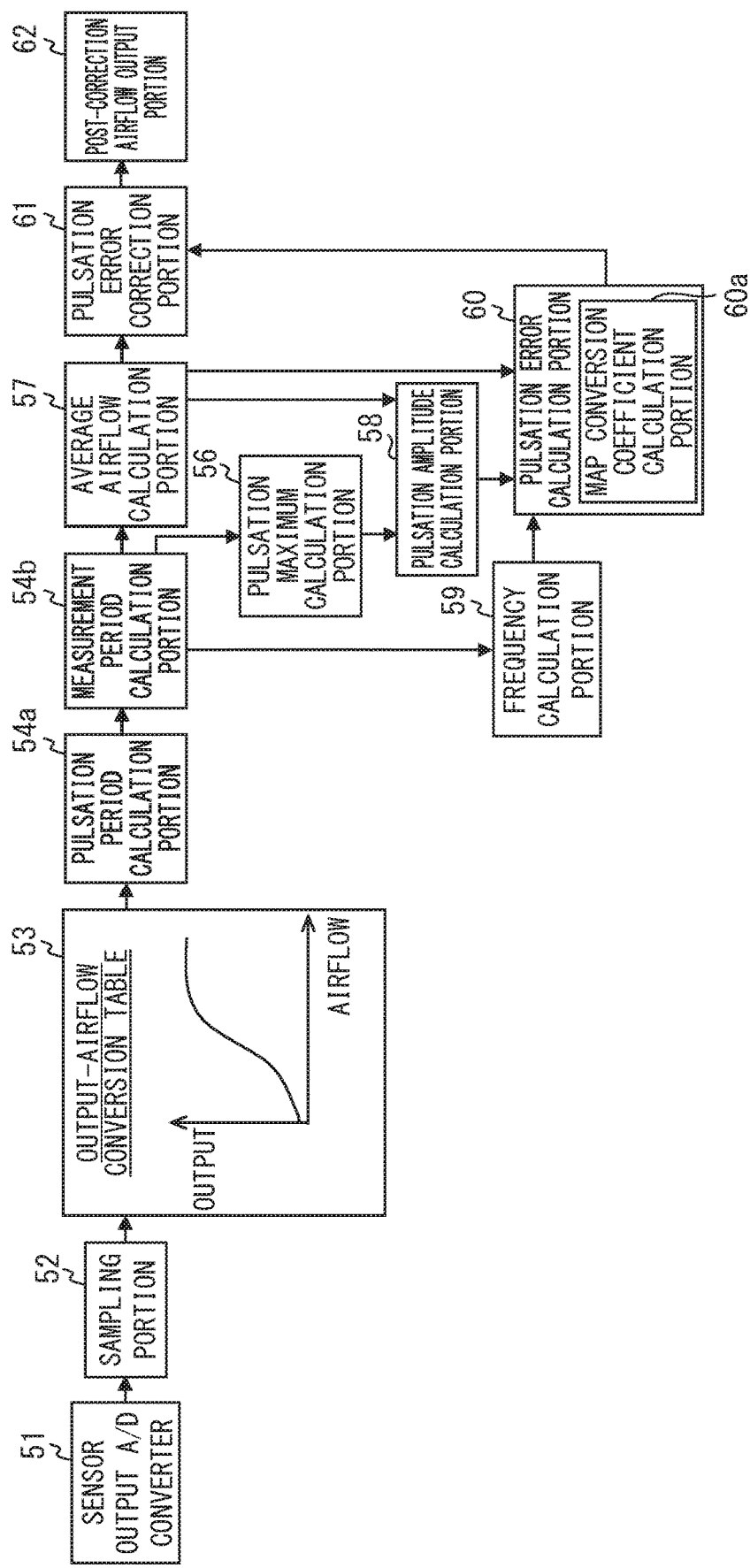
FIG. 20 is a block diagram showing a schematic configuration of a processing portion according to a second embodiment.

An airflow meter 10 according to a second embodiment will be described with reference to FIGS. 20, 21, and 22. In the present embodiment, a method of determining measurement periods for measuring the average airflow Gave and the pulsation maximum Gmax differs from that in the first embodiment. An airflow meter 10 includes a pulsation period calculation portion 54a and a measurement period calculation portion 54b instead of the sampling portion 54 and the local maximum determination portion 55.

The pulsation period calculation portion 54a calculates a pulsation period of air. More specifically, the pulsation period calculation portion 54a calculates the pulsation cycle by use of an airflow converted by an output-airflow conversion table 53.

The measurement period calculation portion 54b changes the measurement period for obtaining the average airflow Gave and the pulsation maximum Gmax in accordance with the pulsation period obtained by the pulsation period calculation portion 54a. More specifically, the measurement period calculation portion 54b makes the measurement period longer when the pulsation period is longer than when the pulsation period is shorter. For example, the measurement period calculation portion 54b sets one cycle, which is the pulsation cycle obtained by the pulsation period calculation portion 54a, as the measurement period.

Figure 21:
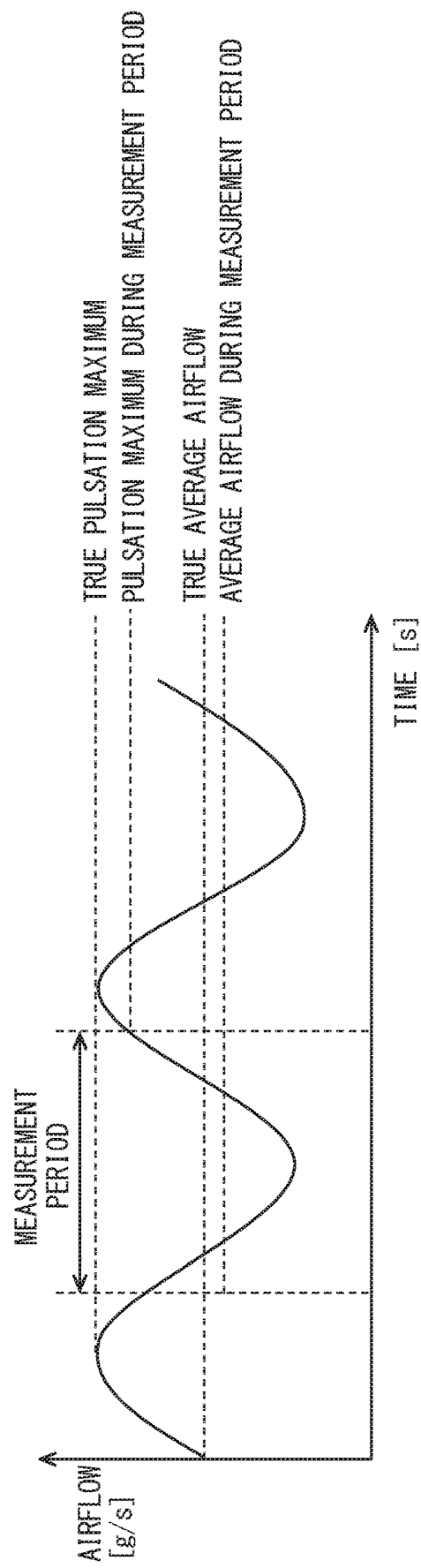
FIG. 21 is a waveform diagram showing a maximum flow rate and an average airflow when the measurement period is short.

For example, as shown in FIG. 21, when the measurement period is shorter than the pulsation period, an error occurs between the true pulsation maximum GmaxT and the pulsation maximum Gmax during the measurement period. Similarly, errors occur in the true average airflow GaveT and the average airflow Gave during the measurement period. Therefore, in that case, the accuracy of the pulsation error Err and the correction amount Q is lowered.

Figure 22:
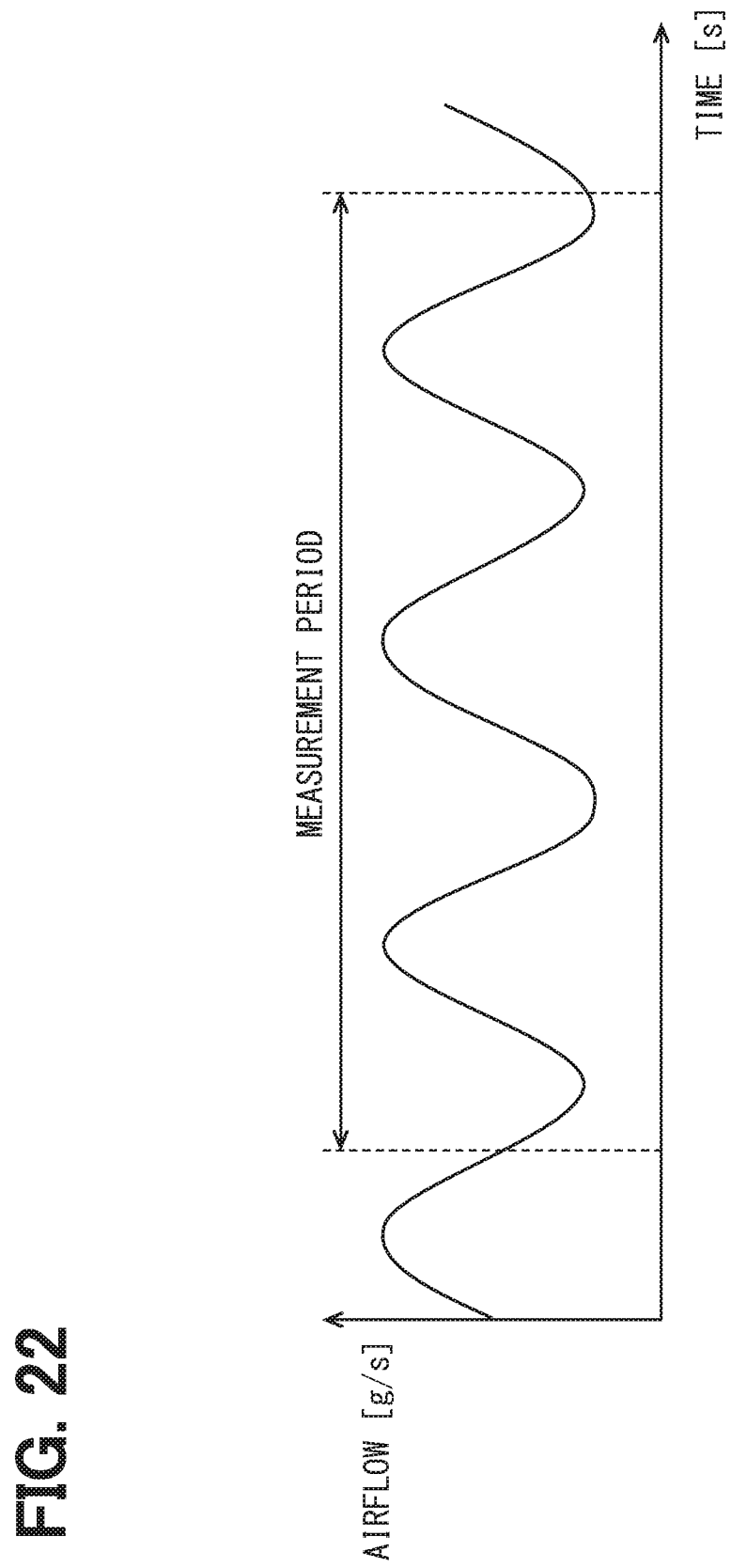
FIG. 22 is a waveform diagram showing a long measurement period.

As shown in FIG. 22, when the measurement period is longer than the pulsation period, the time required to obtain the average airflow Gave and the pulsation maximum Gmax becomes longer. Therefore, in that case, a time until the pulsation error Err and the correction amount Q are obtained is long, and the responsiveness is deteriorated.

However, since the airflow meter 10 changes the measurement period in accordance with the pulsation period as described above, the calculation accuracy of the average airflow Gave and the pulsation maximum Gmax can be improved, and the responsiveness can be improved. Naturally, the airflow meter 10 according to the present embodiment can exhibit the same effects as those of the airflow meter 10 according to the first embodiment.

Third Embodiment

Figure 23:
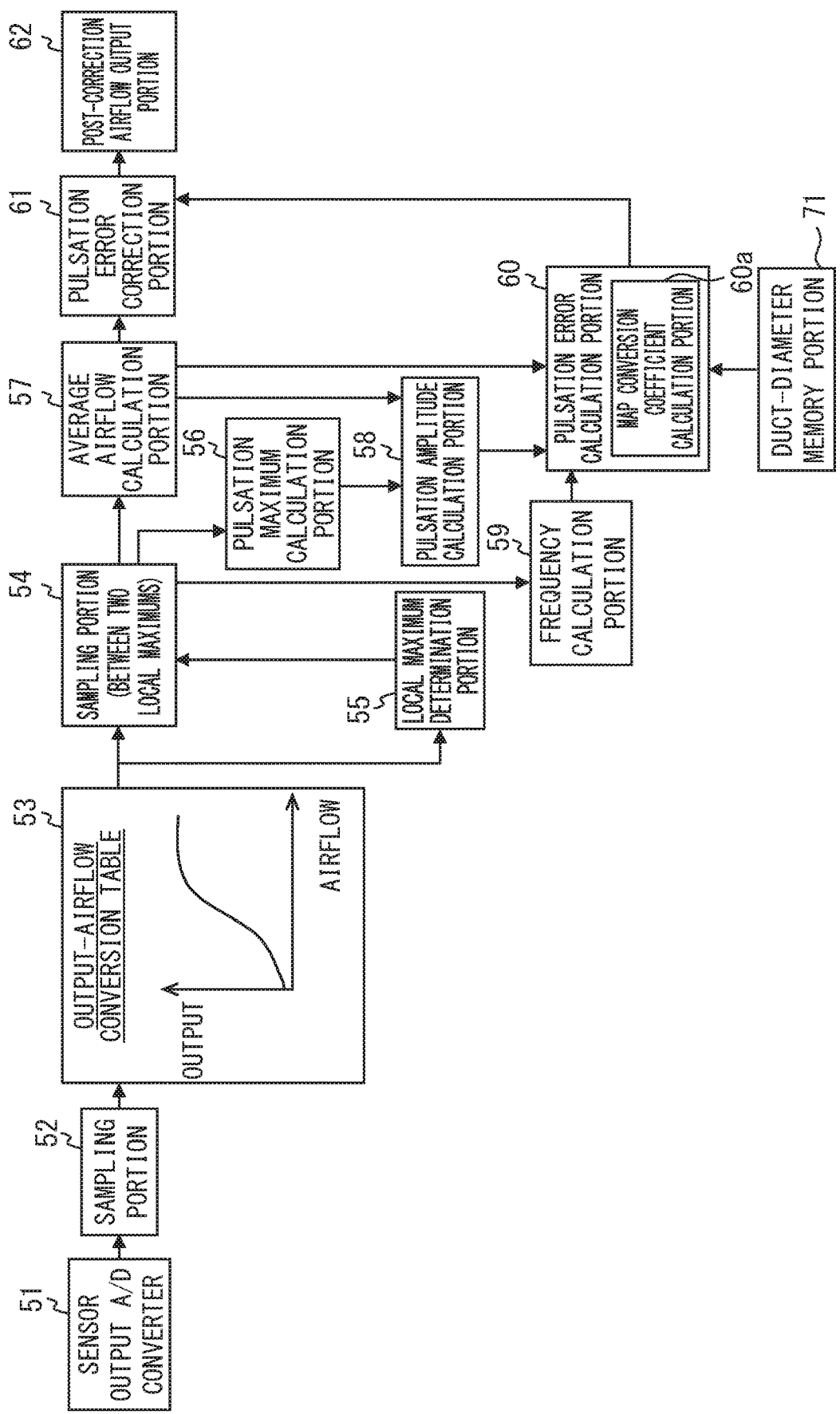
FIG. 23 is a block diagram showing a schematic configuration of a processing portion according to a third embodiment.
Figure 25:
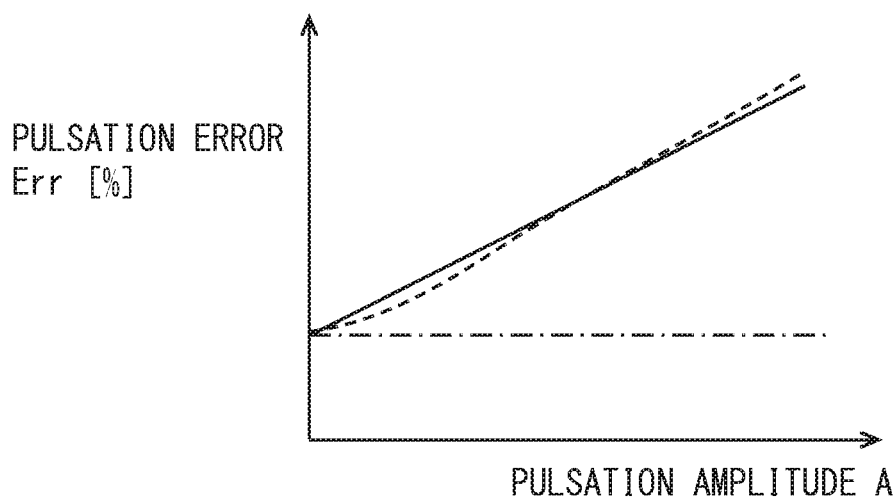
FIG. 25 is a diagram showing a pulsation amplitude to a pulsation error.

An airflow meter 10 according to a third embodiment will be described with reference to FIGS. 23, 24, and 25. In the present embodiment, as shown in FIG. 23, a processing portion 45 includes a duct-diameter memory portion 71, and the duct-diameter memory portion 71 stores a duct diameter H, which is a diameter of a duct in which the airflow meter 10 is mounted. In the processing portion 45, the duct diameter H stored in the duct-diameter memory portion 71 is input to a pulsation error calculation portion 60.

A relationship between a pulsation error Err and a pulsation amplitude Pa differs depending on the combinations of multiple pulsation frequencies F and multiple average airflow Gave. Further, a relationship between the pulsation error Err and the pulsation amplitude Pa differs depending on the duct diameter H because a flow velocity distribution in the duct changes depending on the duct diameter H even if the average airflow Gave and the pulsation frequency F are the same. FIG. 25 shows a relationship between a pulsation error Err and a pulsation amplitude Pa in the case of a certain duct diameter H. This is different depending on the duct diameter H as shown in FIG. 24.

Therefore, the pulsation error calculation portion 60 predicts the pulsation error Err by use of the pulsation amplitude Pa, the pulsation frequency F, the average airflow Gave, and the duct diameter H. In other words, in addition to the pulsation amplitude Pa, the pulsation frequency F, and the average airflow Gave, the pulsation error calculation portion 60 predicts the pulsation error Err correlated with the duct diameter H. In this instance, the pulsation error calculation portion 60 predicts the pulsation error Err correlated with the pulsation amplitude Pa, the pulsation frequency F, the average airflow Gave, and the duct diameter H by use of, for example, a three-dimensional map shown in FIG. 24 and an error prediction formula shown in Formula 3.

The airflow meter 10 has a three-dimensional map as shown in FIG. 24. The three-dimensional map has two-dimensional maps corresponding to the respective map values H1 to Hn of the duct diameter H. In the two-dimensional map, multiple combinations of the average airflow Gave and the pulsation frequency F are associated with a combination of the slope Cnnn and the intercept Bnnn correlated with the respective combinations. In detail, the two-dimensional maps have, for example, map values Gave1 to Gaven of the average airflow Gave on one axis and map values F1 to Fn of the pulsation frequency F on the other axis. In the two-dimensional map, each combination of the slope Cnnn and the intercept Bnnn is associated with each combination of the map value Gave1 to Gaven of the average airflow Gave and the map values F1 to Fn of the pulsation frequency F. Each of the slope Cnnn and the intercept Bnnn can be obtained by experiments or simulations using actual machines. Each of the two-dimensional maps is the same as the reference map of the first embodiment.

For example, when the map values of the duct diameter H, the pulsation frequency F, and the average airflow Gave are H1, F1, and Gave1, the pulsation error calculation portion 60 acquires the slope C111 and the intercept B111 by use of the map.

According to the present embodiment, the pulsation error Err correlated with the pulsation amplitude Pa, the average airflow Gave, the pulsation frequency F, and the duct diameter H is predicted and the correction is made by use of the pulsation error Err. For that reason, correction with higher accuracy can be performed than in the case where correction is performed by use of only the pulsation error Err corresponding to the pulsation amplitude Pa.

Fourth Embodiment

Figure 26:
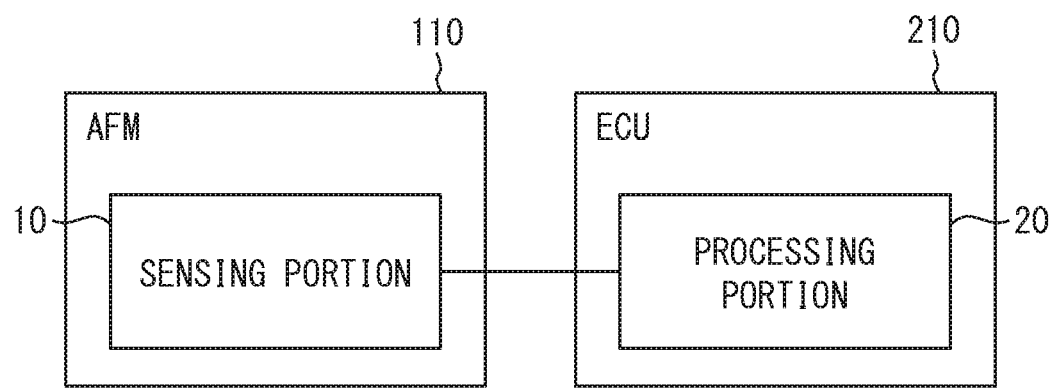
FIG. 26 is a block diagram showing a schematic configuration of an AFM according to a fourth embodiment.

An airflow meter 10 according to a fourth embodiment will be described with reference to FIG. 26. The present embodiment differs from the first embodiment in that a sensing portion 22 is provided in an airflow meter 10 and a processing portion 45 is provided in an ECU 46. In other words, in the present embodiment, the present disclosure can be regarded as an example applied to the processing portion 45 provided in the ECU 46. The present disclosure may include the sensing portion 22 in addition to the processing portion 45.

For that reason, the airflow meter 10 and the ECU 46 can achieve the same effects as those of the airflow meter 10. Further, since the airflow meter 10 does not include the processing portion 45, a processing load can be reduced as compared with the airflow meter 10. In the present embodiment, the ECU 46 calculates a pulsation amplitudes Pa and a pulsation frequency F.

Fifth Embodiment

Figure 27:
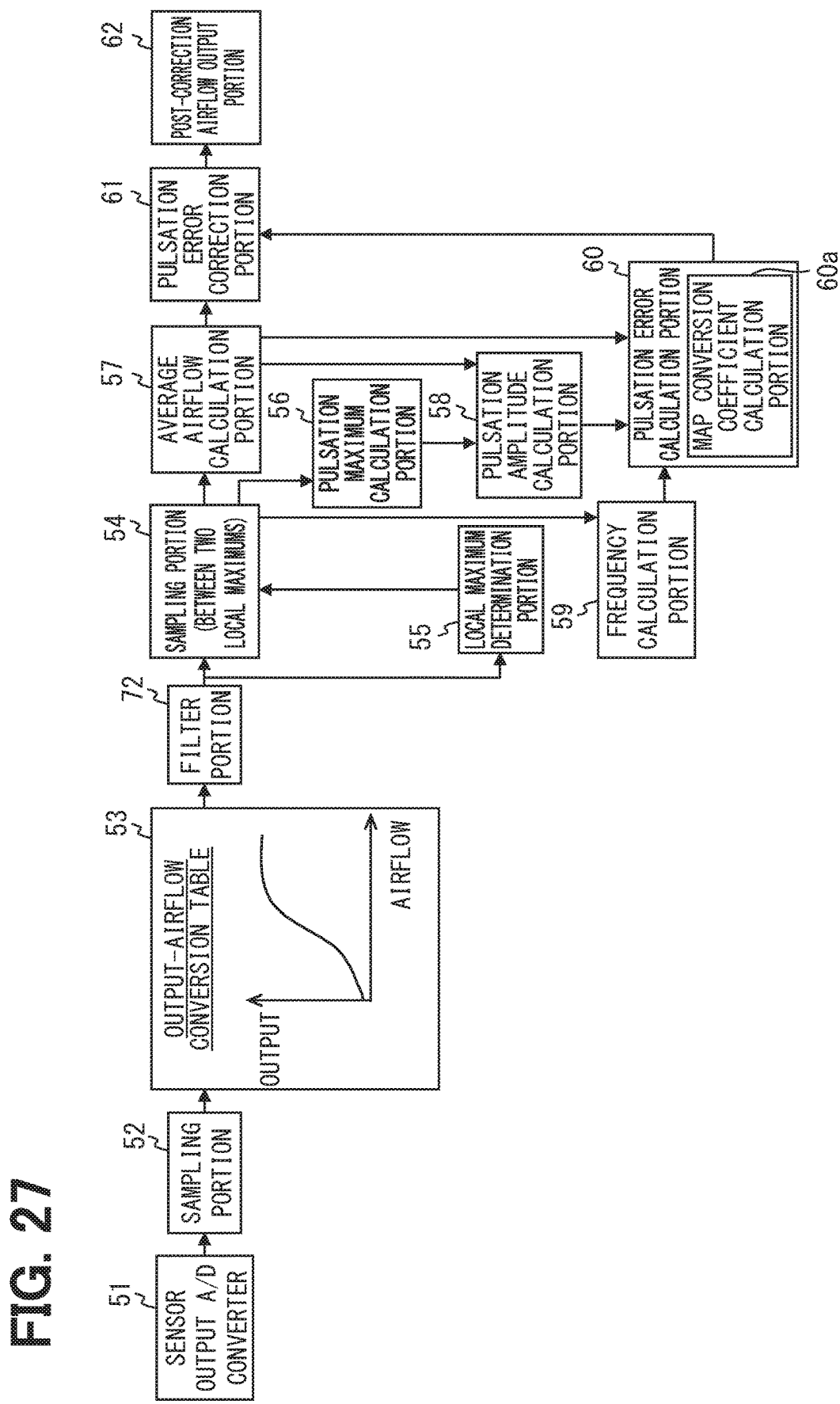
FIG. 27 is a block diagram showing a schematic configuration of a processing portion according to a fifth embodiment.

An airflow meter 10 according to a fifth embodiment will be described with reference to FIGS. 27 and 28. In the present embodiment, as shown in FIG. 27, a processing portion 45 includes a filter portion 72.

The filter portion 72 is provided upstream of a sampling portion 54 and a local maximum determination portion 55. The filter portion 72 performs a filter processing on an output value, which is an output signal, and outputs a processed output value. In the present embodiment, the processing portion 45 in which the filter portion 72 is provided between an output-airflow conversion table 53 and the sampling portion 54 as well as the local maximum determination portion 55 is employed. The processed output value can also be referred to as a processed output signal.

The filter portion 72 may be, for example, a low-pass filter. In a waveform shown in FIG. 28, a dashed line represents an output signal before the filter processing, and a solid line represents an output signal after the filtering process. The output signal after the filter processing in FIG. 28 is a processed output signal in the case where a low-pass filter having a time constant of 3 ms is employed as the filter portion 72.

For that reason, the average airflow calculation portion 57 calculates the average airflow Gave from the processed output value as the output value. The pulsation maximum calculation portion 56 obtains a pulsation maximum Gmax from the processed output value as the output value.

Figure 28:
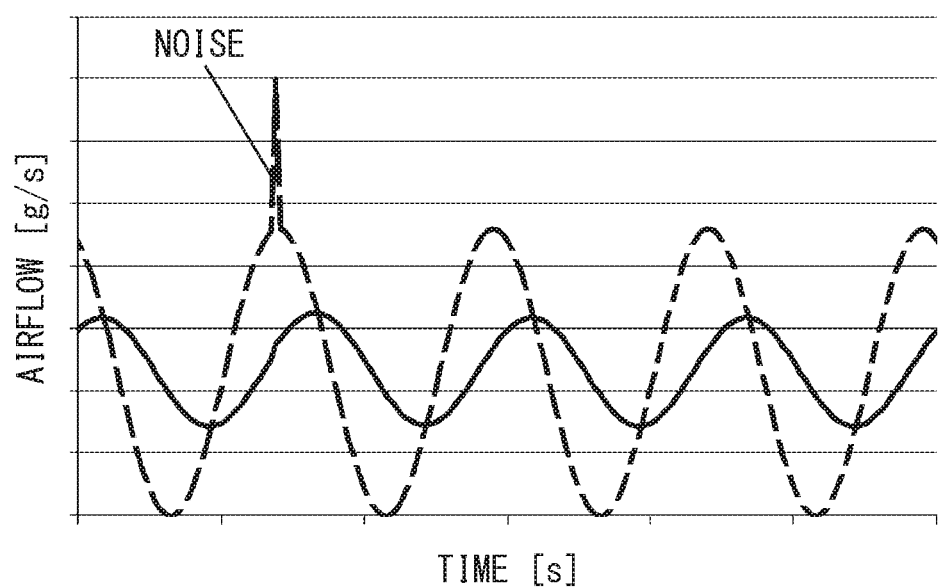
FIG. 28 is a waveform diagram showing a relationship between an airflow and a time.

According to the present embodiment, as shown in FIG. 28, even when noise is superimposed on the output value, the influence of disturbance of the output due to electrical noise or turbulence can be reduced, and the detection accuracy of the local maximum can be improved.

Sixth Embodiment

Figure 29:
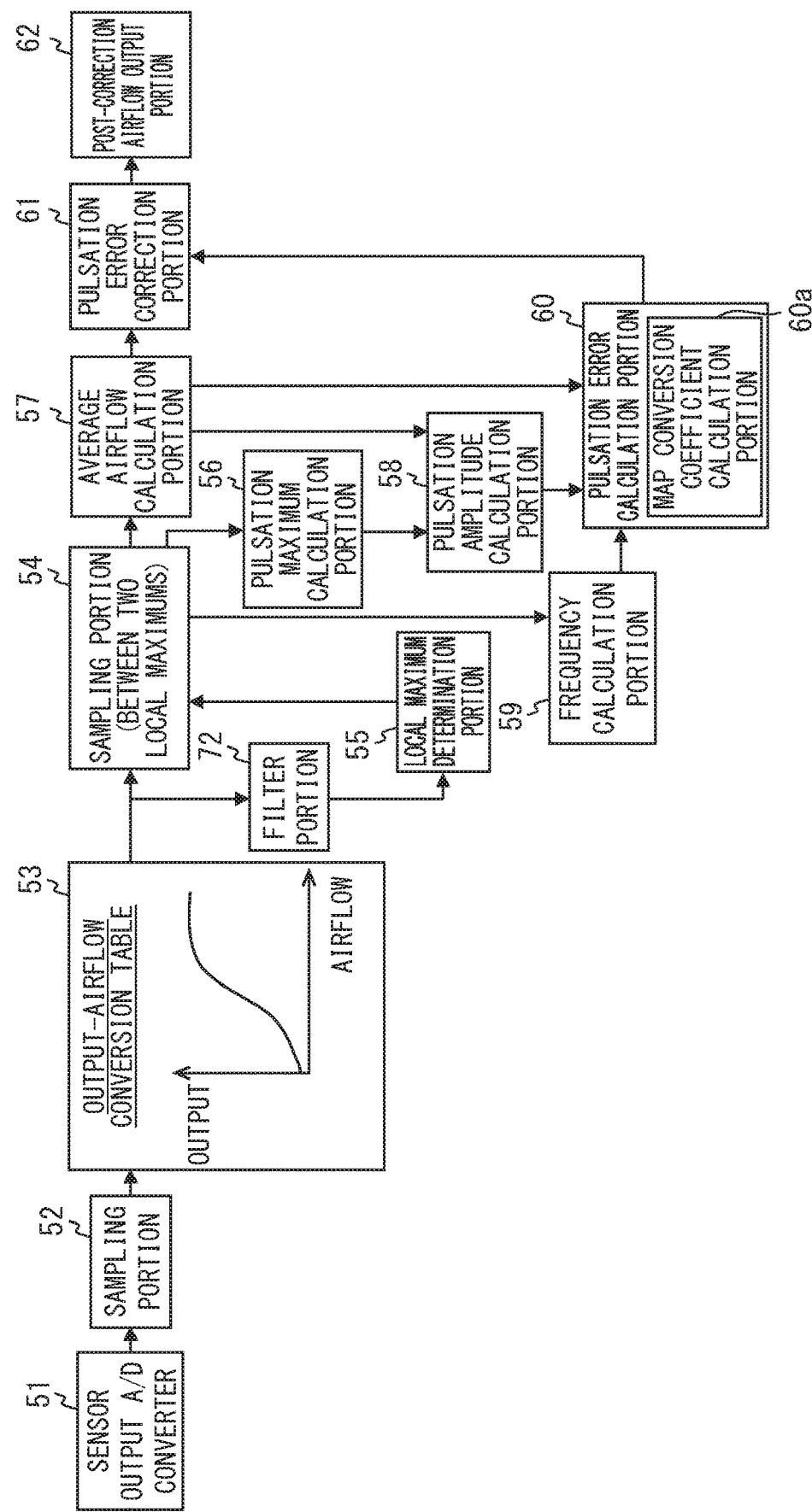
FIG. 29 is a block diagram showing a schematic configuration of a processing portion according to a sixth embodiment.

The airflow meter 10 according to a sixth embodiment will be described with reference to FIGS. 29 and 30. In the present embodiment, as shown in FIG. 29, a processing portion 45 includes a filter portion 72.

The filter portion 72 is provided upstream of a local maximum determination portion 55. The filter portion 72 performs a filter processing on an output value, which is an output signal of an output-airflow conversion table 53, and outputs a processed output value. In the present embodiment, a processing portion 45 in which the filter portion 72 is provided between the output-airflow conversion table 53 and the local maximum determination portion 55 is employed. The processed output value can also be referred to as a processed output signal.

The filter portion 72 may be, for example, a low-pass filter. In a waveform shown in FIG. 30, a dashed line represents an output signal before the filter processing, and a solid line represents an output signal after the filtering process. The output signal after the filter processings in FIG. 30 is a processed output signal in the case where a low-pass filter having a time constant of 3 ms is employed as the filter portion 72.

The local maximum determination portion 55 determines the processed output value at which the processed output value is switched from an ascending value to a descending value as a first local maximum. Next, the processed output value at which the processed output value is switched from an ascending value to a descending value is determined as a second local maximum. The sampling portion 54 acquires multiple sampling values between two local maximums determined by the local maximum determination portion 55. A pulsation maximum is calculated according to the above sampling values by the pulsation maximum calculation portion 56, an average airflow is calculated by an average airflow calculation portion 57, and a frequency is calculated by a frequency calculation portion 59.

Figure 30:
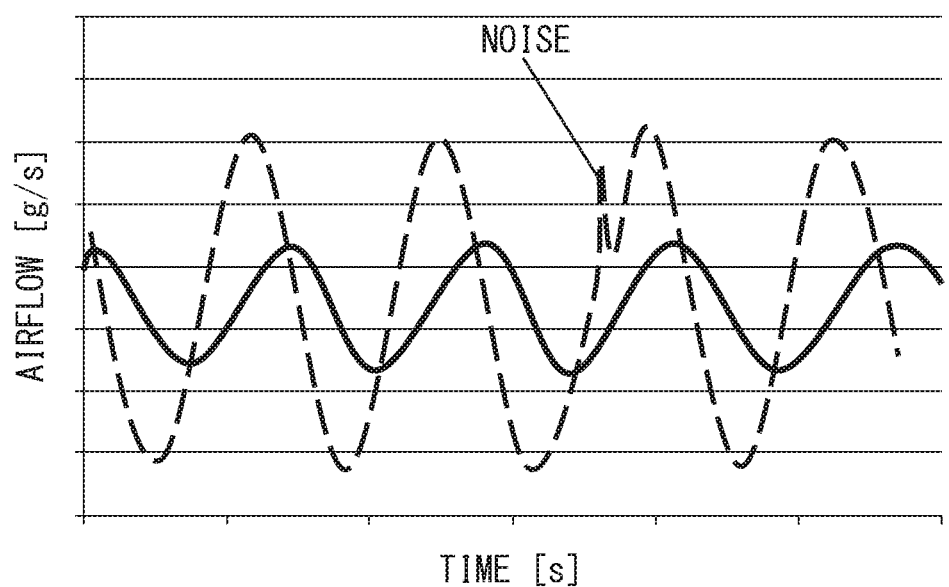
FIG. 30 is a waveform diagram showing a relationship between an airflow and a time.

According to the present embodiment, as shown in FIG. 30, even when noise is superimposed on the output value, the influence of disturbance of the output due to an electrical noise or a turbulence can be reduced, and the detection accuracy of the local maximum due to intake pulsation can be improved.

Other Embodiments

Although a plurality of embodiments according to the present disclosure have been described above, the present disclosure is not construed as being limited to the above-mentioned embodiments, and can be applied to various embodiments and combinations within a scope not departing from the spirit of the present disclosure.

Figure 31:
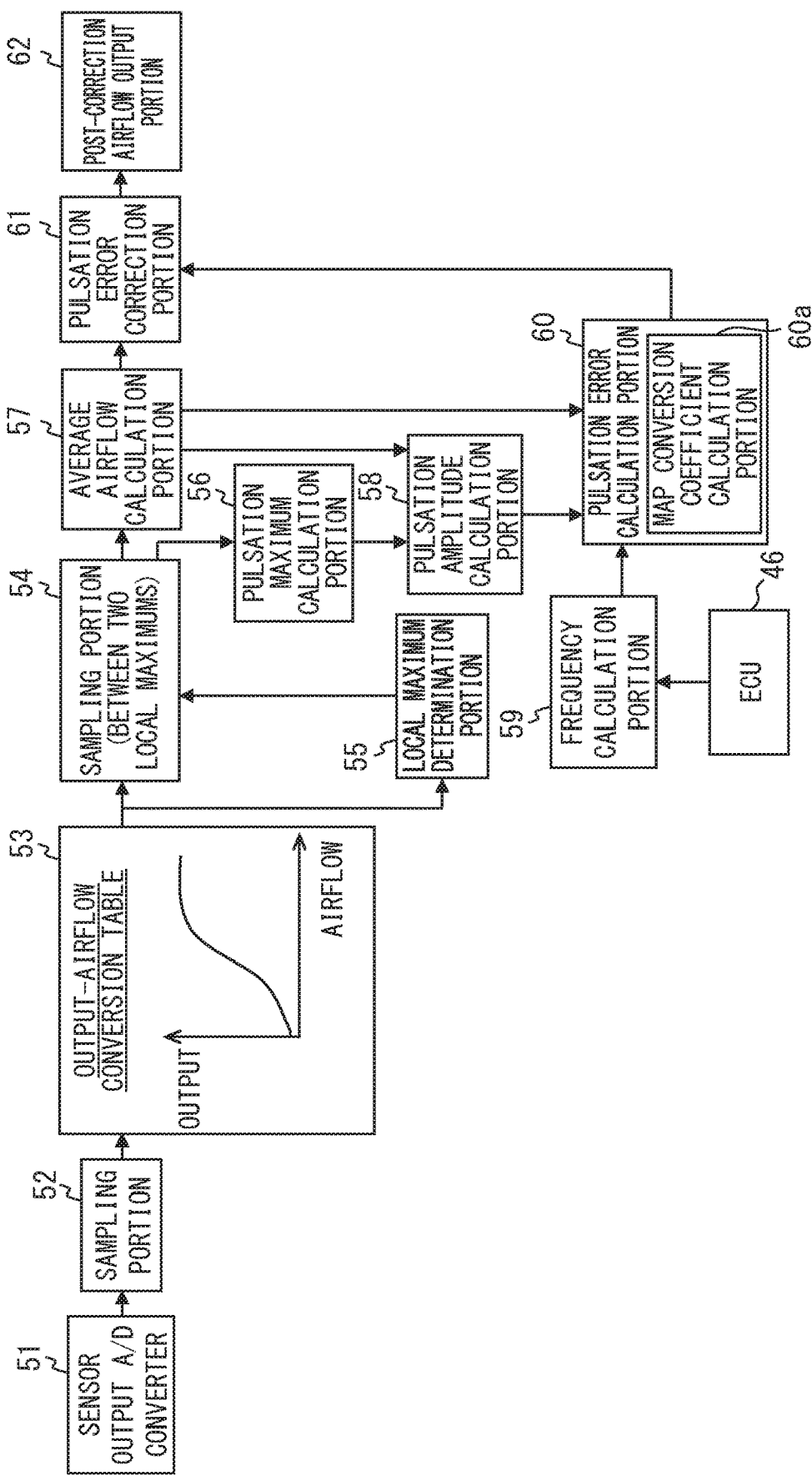
FIG. 31 is a block diagram showing a schematic configuration of a processing portion in Modification 1.

As Modification 1, the frequency calculation portion 59 may calculate the pulsation frequency F based on the signal from the ECU 46. For example, as shown in FIG. 31, the frequency calculation portion 59 is electrically connected to the ECU 46. The frequency calculation portion 59 acquires, for example, a signal indicating an engine rotation speed as a rotation speed of an engine output shaft, a sensor signal of a crank angle sensor, and the like from the ECU 46. The frequency calculation portion 59 calculates the pulsation frequency based on the signal acquired from the ECU 46. In that case, the frequency calculation portion 59 may acquire the pulsation frequency F by use of, for example, a map in which the engine rotation speed and the pulsation frequency F are associated with each other. In the above configuration, since the pulsation frequency is acquired based on the information from the ECU 46, a processing load of the processing portion 45 can be reduced as compared with the case in which the pulsation frequency is calculated according to the multiple sampling values acquired by the sampling portion 52.

Figure 32:
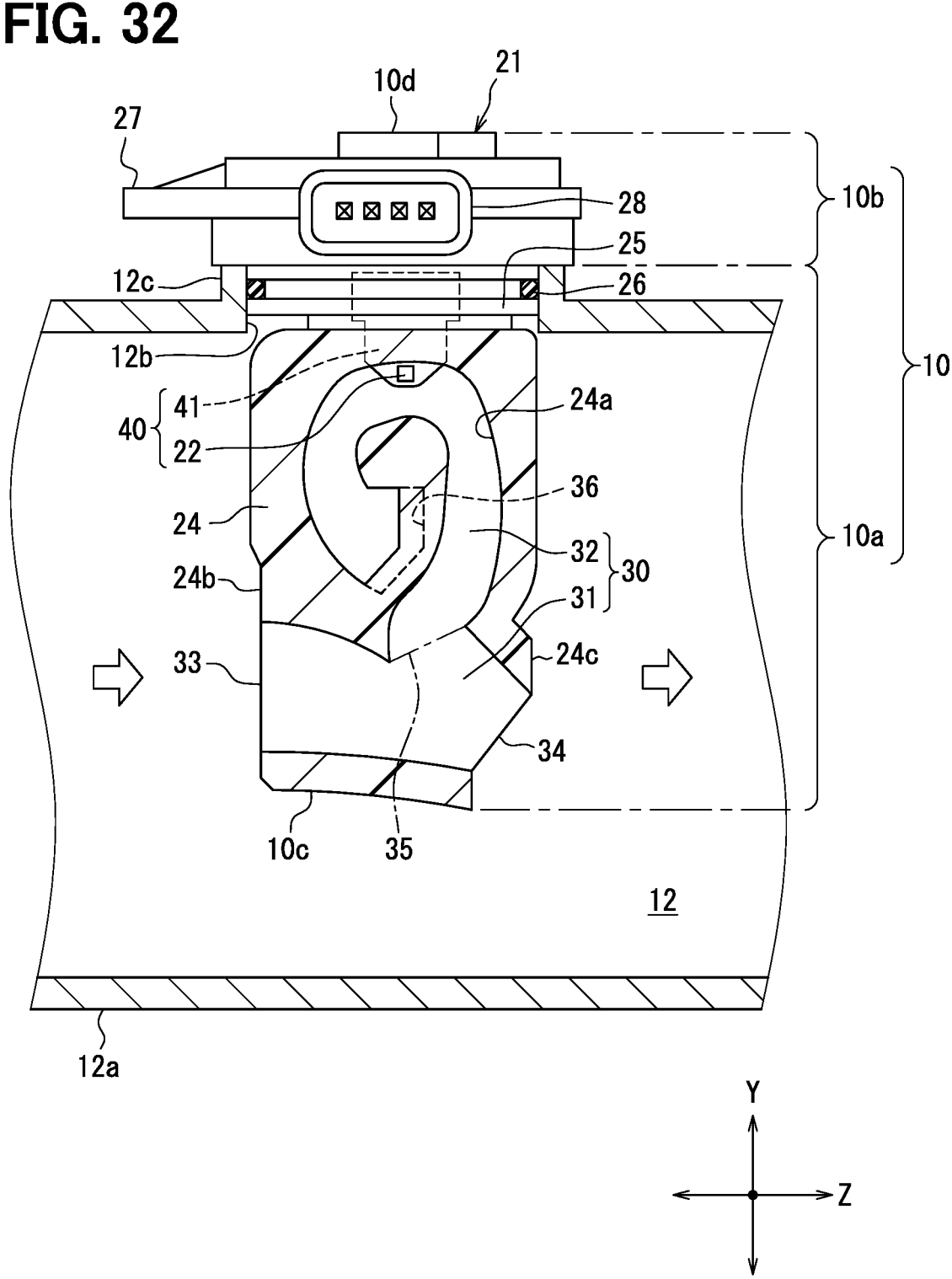
FIG. 32 is a vertical cross-sectional view of an airflow meter in a state attached to an intake pipe in Modification 2.

As Modification 2, the measurement outlet 36 may face the opposite side of the inflow port 33, similarly to the outflow port 34. For example, as shown in FIG. 32, the measurement outlet 36 is provided between the inflow port 33 and the outflow port 34 in the depth direction Z. In the above configuration, since the measurement outlet 36 is provided in a projection portion protruding from the outer peripheral surface of the housing 21 in the width direction X, the measurement outlet 36 is opened toward the downstream side of the intake passage 12 similarly to the outflow port 34. In the intake passage 12, the air flowing in the forward direction along the outer peripheral surface of the housing 21 passes through the measurement outlet 36, so that a turbulence of the airflow such as a vortex flow is apt to occur around the measurement outlet 36. For that reason, even if the measurement outlet 36 faces the side opposite to the inflow port 33, it is considered that the backward flow does not easily flow into the measurement outlet 36 when the backward flow of the air occurs in the intake passage 12.

On the other hand, also in the present modification, the pulsation error Err is calculated by use of the pulsation amplitude Pa. For that reason, even if the correction accuracy of the airflow is likely to be lowered because the backward flow is less likely to flow into the measurement outlet 36, the correction accuracy can be enhanced similarly to the first embodiment. Further, in the first embodiment, the measurement outlet 36 may be provided on the downstream outer surface 24c, and thus may be opened toward the side opposite to the inflow port 33.

As Modification 3, in the housing 21, a part of the measurement outlet 36 may be provided on the upstream outer surface 24b, and the remaining part may not be provided on the intermediate outer surfaces 24d, but the entire measurement outlet 36 may be provided on the upstream outer surface 24b or the intermediate outer surfaces 24d. When the entire measurement outlet 36 is provided on the upstream outer surface 24b, a configuration in which the measurement outlet 36 is opened toward the side opposite to the outflow port 34 is realized. When the entire measurement outlet 36 is provided on the intermediate outer surfaces 24d, a configuration in which the measurement outlet 36 is opened in the width direction X is realized. In the above configuration, the opening direction of the measurement outlet 36 is different from both the opening direction of the inflow port 33 and the opening direction of the outflow port 34.

As Modification 4, the correction amount Q used by the pulsation error correction portion 61 for correction of the airflow or the correction value which is the corrected airflow corrected by the pulsation error correction portion 61 may be included in the pulsation characteristic as the correction parameter. In the above pulsation characteristic, a relationship between the pulsation amplitude Pa and the correction amount or the correction value is shown, and in Step S104 of the pulsation error calculation process, the correction amount or the correction value corresponding to the conversion amplitude PaKn is acquired as the conversion value converted through the pulsation characteristic.

As Modification 5, in Step S101 of the pulsation error calculation process, the pulsation characteristic may be selected regardless of a difference between the map values G1 to Gn of the average airflow Gave and the average airflow GaveA of the output signals. Also, in this instance, the map conversion coefficient Kn is calculated and the conversion amplitude PaKn is calculated for the selected pulsation characteristics, thereby being capable of enhancing the correction accuracy of the airflow as compared with a configuration in which the conversion amplitude PaKn is not calculated.

As Modification 6, in Step S101 of the pulsation error calculation process, the multiple pulsation characteristics of the reference map are selected, but one pulsation characteristic may be selected. For example, even if one pulsation characteristic is selected, the conversion amplitude PaKn is calculated by calculating the map conversion coefficient Kn for one pulsation characteristic, thereby being capable of increasing the correction accuracy of the airflow.

As Modification 7, the map conversion coefficient Kn may not be a value obtained by dividing the map value Gn of the average airflow Gave by the average airflow GaveA of the output signal, as long as the relationship between the average airflow GaveA of the output signal and the map value Gn can be made numerical. For example, the average airflow GaveA of the output signal may be a value obtained by dividing the average airflow GaveA of the output signal by the map value Gn of the average airflow Gave. A difference between the average airflow GaveA of the output signal and the map value G1 may be calculated, and a ratio between the difference and the map value G1 of the average airflow GaveA or the average airflow Gave of the output signal may be used as the map conversion coefficient Kn.

As Modification 8, even if the map values Gn of the average airflow Gave are the same value, if the map values Fn of the pulsation frequency F are different from each other in the reference map, different map conversion coefficients Kn may be set. For example, when the map conversion coefficient Kn is calculated by use of the average airflow GaveA of the output signal and the map value Gn, the map conversion coefficient Kn is set to a larger value as the map value Fn of the pulsation frequency F is larger.

As Modification 9, in the pulsation error calculation process, the pulsation amplitude PaA of the output signal may not be converted into the conversion amplitude PaKn, and the pulsation error Err corresponding to the pulsation amplitude PaA of the output signal in the selected pulsation characteristic may be used as it is for correction of the airflow. As described above, even in the configuration in which the correction of the airflow is performed without using the map conversion coefficient Kn, since the pulsation characteristic includes the pulsation amplitude Pa instead of the pulsation rate or the pulsation amplitude ratio, the correction accuracy of the airflow can be enhanced.

As Modification 10, in Step S105 of the pulsation error calculation process, the weighting may be performed for the multiple correlation points Xnn by use of the average airflow GaveA of the output signal or the pulsation amplitude PaA of the output signal, and the curved surface may be set as an interpolation plane in accordance with the weighting. The multiple correlation points Xnn may be interpolated not by a plane but by a line.

As Modification 11, in Step S105 of the pulsation error calculation process, the correlation point Xnn is acquired by the correlation between the average airflow Gave and the conversion error ErrKn, but the correlation point Xnn may be acquired by the correlation between the pulsation amplitude Pa and the conversion error ErrKn.

As Modification 12, in Step S105 of the pulsation error calculation process, instead of interpolating the multiple correlation points Xnn, the average value of the respective conversion errors ErrKn of those correlation points Xnn may be calculated as the pulsation error ErrA after conversion. Further, in each correlation point Xnn, after the weighting corresponding to the differences between the respective conversion amplitudes PaKn and the pulsation amplitude PaA of the output signal are added to the respective conversion errors ErrKn, the average value of those conversion errors ErrKn may be set as the pulsation error ErrA after conversion.

As Modification 13, although the reference map is used as the reference information having multiple pulsation characteristics as the correction characteristics, the reference information may be a mathematical expression, a database, or the like as long as the relationship between the pulsation error Err and the pulsation amplitude Pa as the correction parameters is shown.

As Modification 14, the pulsation amplitude calculation portion 58 may calculate the difference between the pulsation maximum GmaxA and the pulsation minimum GminA as the pulsation amplitude PaA instead of the difference between the pulsation maximum GmaxA and the average airflow GaveA for the output signal.

As Modification 15, the functions realized by the processing portion 45 may be realized by hardware and software, or a combination of the hardware and the software. The processing portion 45 may communicate with, for example, another control device, such as the ECU 46, and the other control device may perform some or all of the processing. The processing portion 45, when implemented by an electronic circuit, can be implemented by a digital circuit including a large number of logic circuits, or an analog circuit.

What is claimed is:

1. A measurement control device that measures an airflow based on an output value of a sensor which detects the airflow, the measurement control device comprising:
    an amplitude calculator that calculates a pulsation amplitude by use of the output value, the pulsation amplitude being a difference between a pulsation maximum and an average airflow or a difference between the pulsation maximum and a pulsation minimum, the pulsation maximum being a maximum value of pulsation generated in the airflow, the average airflow being an average value of the pulsation, the pulsation minimum being a minimum value of the pulsation;
    an average calculator that calculates the average airflow by use of the output value;
    a storage device that stores correction characteristics that each represents a relationship between the pulsation amplitude and a correction parameter in such a manner that the correction characteristics are correlated to different average airflows;
    a characteristic selector that selects a correction characteristic from among the correction characteristics stored in the storage device based on the average airflow calculated by the average calculator;
    a correction parameter acquirer that acquires the correction parameter corresponding to the pulsation amplitude calculated by the amplitude calculator by use of the correction characteristic selected by the characteristic selector; and
    an airflow corrector that corrects the airflow by use of the correction parameter acquired by the correction parameter acquirer.

2. The measurement control device according to claim 1, further comprising:
    a coefficient calculator that calculates a conversion coefficient which is a ratio of the average airflow calculated by the average calculator to an average airflow corresponding to the correction characteristic selected by the characteristic selector; and
    an amplitude converter that converts the pulsation amplitude calculated by the amplitude calculator into a conversion amplitude by use of the conversion coefficient calculated by the coefficient calculator, the conversion amplitude being a value included in the correction characteristic that has been selected by the characteristic selector, wherein
    the correction parameter acquirer acquires the correction parameter corresponding to the conversion amplitude converted by the amplitude converter by use of the correction characteristic selected by the characteristic selector.

3. The measurement control device according to claim 2, wherein
    the characteristic selector selects a plurality of correction characteristics,
    the coefficient calculator calculates the conversion coefficient for each of the plurality of correction characteristics selected by the characteristic selector,
    the amplitude converter converts the pulsation amplitude into the conversion amplitude for each of the plurality of correction characteristics selected by the characteristic selector,
    the correction parameter acquirer acquires the correction parameter for each of the plurality of correction characteristics selected by the characteristic selector, and
    the airflow corrector corrects the airflow by use of the plurality of correction parameters acquired by the correction parameter acquirer.

4. The measurement control device according to claim 3, further comprising:
    an interpolation parameter acquirer that interpolates the plurality of correction parameters acquired by the correction parameter acquirer so as to acquire an interpolation parameter corresponding to the pulsation amplitude calculated by the amplitude calculator, wherein
    the airflow corrector corrects the airflow by use of the interpolation parameter acquired by the interpolation parameter acquirer.

5. The measurement control device according to claim 3, wherein
    the characteristic selector selects the correction characteristics corresponding to, respectively, at least two average airflows which are smallest in difference from the average airflow calculated by the average calculator among the average airflows correlated to the correction characteristics.

6. The measurement control device according to claim 2, further comprising
    a frequency calculator that calculates a pulsation frequency which is a frequency of the pulsation included in the output value, wherein
    the correction characteristics stored in the storage device are correlated to different pulsation frequencies, and
    the characteristic selector selects the correction characteristic from among the correction characteristics based on both the average airflow calculated by the average calculator and the pulsation frequency calculated by the frequency calculator.

7. The measurement control device according to claim 1, wherein the correction parameter is a pulsation error which is caused in the airflow by inclusion of the pulsation in the output value.

8. The measurement control device according to claim 1, further comprising:
    a coefficient calculator that calculates a conversion coefficient which is a ratio of the average airflow calculated by the average calculator to an average airflow corresponding to the correction characteristic selected by the characteristic selector; and
    the correction parameter acquirer acquires the correction parameter by use of the conversion coefficient.

9. A flow measurement device that measures an airflow which is a flow rate of an air, the flow measurement device comprising:
    a passage flow channel that has an inflow port through which the air flows in and an outflow port through which the air flows out;

a branch flow channel that is branched off from the passage flow channel and has a branch outlet through which the air that has flowed in from the passage flow channel flows out;

a sensor that detects the airflow in the branch flow channel; and a measurement controller that measures the airflow by use of an output value of the sensor, wherein the measurement controller includes:

an amplitude calculator that calculates a pulsation amplitude by use of the output value, the pulsation amplitude being a difference between a pulsation maximum and an average airflow or a difference between the pulsation maximum and a pulsation minimum, the pulsation maximum being a maximum value of pulsation generated in the airflow, the average airflow being an average value of the pulsation, the pulsation minimum being a minimum value of the pulsation;

an average calculator that calculates the average airflow by use of the output value;

a storage device that stores correction characteristics that each represents a relationship between the pulsation amplitude and a correction parameter in such a manner that the correction characteristics are correlated to different average airflows;

a characteristic selector that selects a correction characteristic from among the correction characteristics stored in the storage device based on the average airflow calculated by the average calculator;

a correction parameter acquirer that acquires the correction parameter corresponding to the pulsation amplitude calculated by the amplitude calculator by use of the correction characteristic selected by the characteristic selector; and an airflow corrector that corrects the airflow by use of the correction parameter acquired by the correction parameter acquirer.

10. The flow measurement device according to claim 9, wherein the branch outlet faces in a direction orthogonal to an alignment direction in which the inflow port and the outflow port are aligned, or faces in a direction inclined toward the inflow port from the orthogonal direction.

11. The flow measurement device according to claim 10, further comprising a housing that forms the passage flow channel and the branch flow channel, wherein the housing has a pair of end surfaces facing away from each other, and at least a part of the branch outlet is provided on an inflow surface which is one of the pair of end surfaces on which the inflow port is provided.

12. The flow measurement device according to claim 9, wherein the branch outlet and the outflow port face away from the inflow port in a direction in which the inflow port and the outflow port are aligned.

13. A measurement control device that measures an airflow based on an output value of a sensor which detects the airflow, the measurement control device comprising:

an amplitude calculator that calculates a pulsation amplitude by use of the output value, the pulsation amplitude being a difference between a pulsation maximum and an average airflow or a difference between the pulsation maximum and a pulsation minimum, the pulsation maximum being a maximum value of pulsation generated in the airflow, the average airflow being an average value of the pulsation, the pulsation minimum being a minimum value of the pulsation;

a correction parameter acquirer that acquires a correction parameter corresponding to the pulsation amplitude calculated by the amplitude calculator by use of a correction characteristic for performing correction of the airflow;

an airflow corrector that corrects the airflow by use of the correction parameter acquired by the correction parameter acquirer;

an average calculator that calculates the average airflow by use of the output value;

a characteristic selector that selects the correction characteristic from reference information indicating a predetermined relationship between the correction characteristic and the average airflow for the acquisition of the correction parameter by the correction parameter acquirer;

a coefficient calculator that calculates a conversion coefficient which is a ratio of the average airflow calculated by the average calculator to an average airflow corresponding to the correction characteristic selected by the characteristic selector; and an amplitude converter that converts the pulsation amplitude calculated by the amplitude calculator into a conversion amplitude by use of the conversion coefficient calculated by the coefficient calculator, the conversion amplitude being a value included in the correction characteristic that has been selected by the characteristic selector from the reference information, wherein the correction parameter acquirer acquires the correction parameter corresponding to the conversion amplitude converted by the amplitude converter by use of the correction characteristic selected by the characteristic selector.

* * * * *